US011157633B1

(12) United States Patent
Verma et al.

(10) Patent No.: US 11,157,633 B1
(45) Date of Patent: Oct. 26, 2021

(54) DIGITAL CONTENT DELIVERY SYSTEM

(71) Applicant: Amazon Technologies, Inc., Seattle, WA (US)

(72) Inventors: Prashant Verma, Seattle, WA (US); Karthik Uthaman, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 16/453,452

(22) Filed: Jun. 26, 2019

(51) Int. Cl.
G06F 21/10 (2013.01)
G06F 21/60 (2013.01)
H04L 9/08 (2006.01)
H04L 29/06 (2006.01)
H04L 9/32 (2006.01)

(52) U.S. Cl.
CPC ............ *G06F 21/602* (2013.01); *G06F 21/10* (2013.01); *H04L 9/0894* (2013.01); *H04L 9/3213* (2013.01); *H04L 63/0457* (2013.01); *H04L 65/4069* (2013.01); *G06F 2221/0753* (2013.01)

(58) Field of Classification Search
CPC ............. G06F 21/10; G06F 21/602; G06F 2221/0753; G06F 2221/0757; G06F 2221/0764; H04L 63/0457; H04L 63/083; H04L 63/10; H04L 2463/101; H04L 9/0894; H04L 9/3213; H04L 65/4069; G06Q 2220/10; G06Q 2220/18
See application file for complete search history.

(56) References Cited

U.S. PATENT DOCUMENTS

| 2004/0034786 A1* | 2/2004 | Okamoto | G06Q 30/06 713/189 |
| 2004/0039916 A1* | 2/2004 | Aldis | G06F 21/105 713/177 |
| 2005/0021467 A1* | 1/2005 | Franzdonk | G06F 21/10 705/51 |
| 2005/0066353 A1* | 3/2005 | Fransdonk | H04N 21/4405 725/29 |
| 2005/0278259 A1* | 12/2005 | Gunaseelan | G06Q 10/10 705/59 |
| 2014/0289515 A1* | 9/2014 | Sorotokin | H04L 63/123 713/162 |

* cited by examiner

Primary Examiner — Minh Dinh
(74) Attorney, Agent, or Firm — Lee & Hayes, P.C.

(57) ABSTRACT

A centralized content management service may facilitate streaming providers obtaining rights to digital content associated with content providers. The content management service may maintain a site in which the content providers and streaming providers may negotiate for rights to digital content items. Upon receiving a request from a streaming provider to stream a digital content item to a customer, the content management service may authenticate the customer and validate the streaming provider to confirm that the streaming provider is authorized to stream the digital content item to the customer. The digital content item may be encrypted, decrypted, and re-encrypted prior using various encryption keys prior to streaming the digital content item to the customer. The content management service may cause the digital content item to be streamed to a customer device of the customer without providing a copy of the digital content item to the streaming provider.

20 Claims, 11 Drawing Sheets

DIGITAL CONTENT DELIVERY SYSTEM

BACKGROUND

Customers continue to receive digital content (e.g., movies, television shows, music, etc.) via streaming services provided by streaming providers. As a result, a significant amount of data transmitted over the Internet consists of streamed digital content. The catalogs of streaming providers frequently overlap and have a significant amount of comment assets, meaning that streaming providers frequently offer the same digital content to its customers. For instance, a first streaming provider may offer a movie to its customers via first streaming services provided by the first streaming provider, and a second streaming provider may offer the same move to its customers via second streaming services provided by the second streaming provider. This causes multiple, separate streams of the same content to be provided to customers, which increases the amount of data transmitted across networks, resulting in technological problems such as increased network traffic, increased latency, reduced network bandwidth, and so on. Each streaming provider also needs to store that same content, which results in increased storage requirements for the streaming providers. In addition, prior to offering the digital content to its customers, each of the streaming providers must individually obtain the digital rights to that digital content, resulting in the use of additional resources, computing resources and otherwise.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
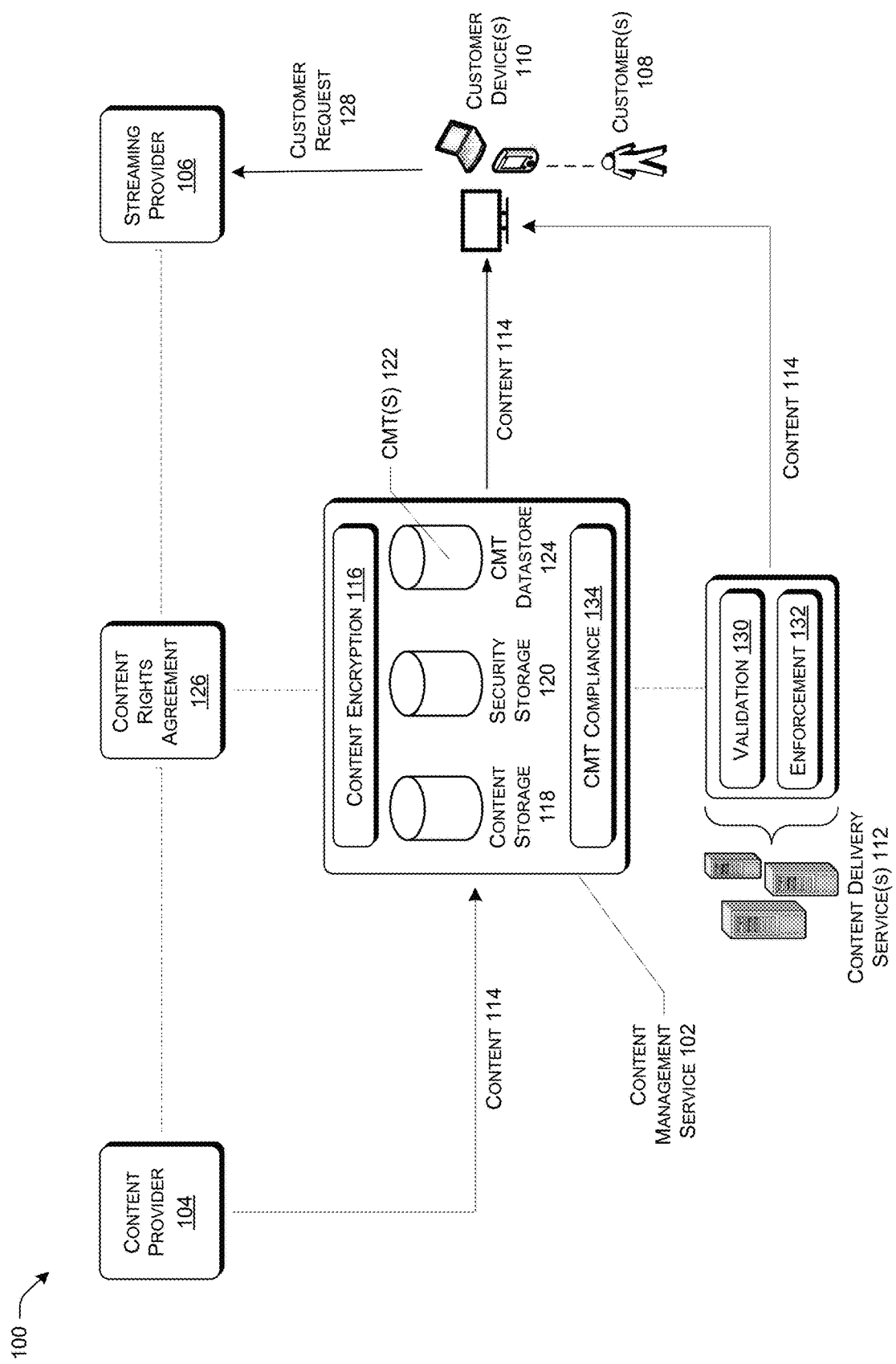
FIG. 1 is a schematic diagram of an illustrative environment that includes a centralized content management service that facilitates the acquisition of rights to digital content between content providers and streaming providers and provides the digital content to customers of the streaming providers.

This disclosure is directed to systems and/or processes for facilitating the acquisition of rights to digital content provided by a content provider and received by a streaming provider. A centralized content management service (CMS) may receive the digital content (also referred to herein as "digital content item," "content," and/or "content item") from the content provider and offer that digital content to various streaming providers that offer streaming services to customers. The CMS may provide a platform that allows content providers and streaming providers to negotiate content metadata templates (CMT), or licenses, with respect to the digital content. A CMT may dictate the rights of a streaming provider to use the digital content (e.g., stream the digital content to its customers). The CMT may also include other terms associated with the streaming provider's use of the digital content, such as price/cost paid by the streaming provider, a duration of use, whether the use is exclusive or non-exclusive, and so on. Upon agreement of the CMT, the streaming provider may be authorized to use the digital content and the CMS may facilitate a process by which the streaming provider may stream the digital content to its customers via a streaming service.

In particular, a content provider, such as a creator, owner, distributor, licensor, etc., of digital content may desire to allow streaming providers to offer and stream the digital content to their customers. The content provider and/or the CMS may generate and/or otherwise obtain one or more CMTs for the digital content provided by the content provider. The CMS may make the CMT(s) accessible to streaming providers via a site or platform. The CMTs may specify terms agreed upon by the content provider in order for a streaming provider to acquire the rights to the digital content and, therefore, offer the digital content to its customers via a site or mobile application. A streaming provider may select, via the site/platform hosted by the CMS, one of the CMTs, which may indicate an intent of the streaming provider to acquire the digital content pursuant to the terms of the CMT (e.g., duration of use, cost/price, exclusivity, etc.). Upon selecting the CMT, the CMS may update a database or data structure to indicate that the streaming provider has obtained rights to use the digital content.

In some embodiments, the streaming provider may not prefer the terms set forth in the one or more CMTs associated with the digital content. In this scenario, via the platform or site hosted by the CMS, the CMS may facilitate a negotiation of the CMT between the content provider and the streaming provider. For instance, the streaming provider may provide, via the platform/site, a counteroffer or revised CMT, such as by adjusting one or more terms of one of the existing CMTs or by providing a new CMT. If the content provider accepts the counteroffer and/or the revised terms, the CMS will update the database/datastore to indicate the terms agreed upon between the content provider and the streaming provider for use of the digital content. In other embodiments, further negotiation regarding the terms of the CMS may occur between the content provider and the streaming provider via the platform/site. For instance, if the content provider does not accept the terms set forth by the streaming provider, the content provider may propose alternative terms. The content provider and the streaming provider may negotiate the terms of the CMT via the platform/site hosted by the CMS until an agreement is reached. The CMS may then update a database/datastore to reflect the CMT for the digital content in which the rights have been acquired by the streaming provider.

Upon the content provider and the streaming provider agreeing to a CMT with respect to the digital content, the CMS may store the digital content and the CMT in a server, database, or datastore that is maintained, or is at least accessible by, the CMS. The CMS may desire to provide for security of the digital content and the CMT to avoid or prevent unauthorized access to the digital content and the CMT. As a result, the CMS may generate and store a master key (also referred to herein as "first key") for the digital content. In some embodiments, the master key may be stored in the same database, datastore, server, etc., as the digital content and the CMT, or a different one. Once generated, the CMS may encrypt the digital content using the master key. In some instances, the master key may be associated with and/or provided to the content provider that initially provided the digital content.

The CMS may also generate and store a second key associated with the digital content. The second key may be used by the streaming provider and/or a different content delivery service, such as a content delivery network (CDN; also referred to herein as a "content distribution network") to encrypt and decrypt the digital content prior to the digital content being rendered/played by a customer device of a customer. Either prior to, while, or after receiving the second key, the streaming provider may update its catalog to include the digital content. That is, since the streaming provider has acquired the rights, via the CMS, to offer the digital content to its customers, the streaming provider may update its database to reflect that the digital content is being offered to customers via streaming services. The streaming provider may also offer the digital content, along with other digital content, to customers via a website, application, and/or mobile application that customers use to search for, view, consume, etc. digital content items provided by the streaming provider. For instance, in addition to streaming content already being offered by the streaming provider, customers of the streaming provider may also be able to stream the digital content in which the rights were acquired by the streaming provider.

Via the website and/or mobile application hosted by the streaming provider, a customer of the streaming provider may request to view or play the digital content discussed above via his/her customer device (e.g., a mobile telephone, a desktop computer, a tablet device, a gaming console, an electronic book (ebook) reader device, etc.). For instance, the digital content may be presented via the website/mobile application and the customer may select the digital content for consumption via the customer device. Upon receiving the request for the digital content from the customer, the streaming provider may generate a validation token associated with the request. The streaming provider may send, and the CMS may receive, the request and/or the validation token. Using the validation token, the CMS may authenticate the customer to ensure that the customer is authorized to receive and consume content offered by the streaming provider. In some embodiments, the validation token may confirm that the customer has provided authentication credentials (e.g., a username and password) to the streaming provider. If the CMS fails to authenticate the customer, the CMS may deny the request for the customer to consume, render, play, etc. the requested digital content. If the request is denied, the CMS may provide such a notification to the streaming provider, which may then notify the customer.

After authenticating the customer that initially submitted the request to the streaming provider, the CMS may retrieve the CMT associated with the digital content. As stated above, the CMT may include the terms agreed upon between the content provider and the streaming provider with respect to use of the digital content by the streaming provider. The CMS may validate the streaming provider to ensure that the streaming provider is authorized to use the digital content. For instance, the CMS may enforce the CMT to determine that, at the time of the request submitted by the customer, the streaming provider currently has rights to use the digital content. Enforcing the CMT may include the CMS determining that the duration of use for the streaming provider to use the digital content has not expired. Upon validating the streaming provider, the CMS may generate a temporary key (also referred to herein as a "third key"), store the temporary key, and/or provide the temporary key to the customer device that is to be used to play the digital content. The CMS may then decrypt the digital content using the master key so that the digital content can be subsequently consumed by the customer. The CMS and/or the content delivery service may re-encrypt the digital content using the temporary key and initiate streaming of the digital content to the customer device. Prior to the customer device rendering the digital content, the customer device may decrypt the digital content using the temporary key previously provided by the CMS. The customer device may then play the decrypted digital content.

Accordingly, instead of different streaming providers each storing a copy of the same digital content and offering that digital content to its customers, the CMS may store a single copy of the digital content. Streaming providers that have acquired the rights to use the digital content, via a CMT agreed upon with the content provider of the digital content, may offer the digital content to customers via its streaming services. The CMS facilitating the consumption of digital content with respect to multiple streaming providers may result in reduced storage requirements, reduced network traffic, increased network bandwidth, decreased latency, and increased amount of processing power associated with servers of the CMS and the streaming providers. The CMS may also provide a single, centralized platform/site that allows content providers of digital content and streaming providers that offer streaming services to negotiate usage rights for the digital content. This may allow for greater efficiency and a reduced amount of resources for both content providers and streaming providers.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a schematic diagram of an illustrative environment 100 that includes a content management service (CMS) 102 that facilitates the consumption of a digital content item by customers of multiple streaming providers using a single copy of the digital content item. The environment 100 further includes a content provider 104, a streaming provider 106, one or more customers 108, customer devices 110 associated with the customers 108, and one or more content delivery services (CDSs) 112, which may be one or more CDNs. The environment 100 may also include one or more networks, which may facilitate communications, and/or the exchange or transmission of data, between the various components illustrated in the environment 100, including the CMS 102, the content provider 104, the streaming provider 106, the customer device(s) 110, and the CDS(s) 112.

The CMS 102 may be any number of servers, an entity, a platform, a service provider, a service provider network, etc., that facilitates the consumption of content 114 (also referred to herein as "digital content") by customers 108 of multiple streaming providers 106. The CMS 102 may maintain a website, platform, database, etc. that is accessible by the content providers 104 and the streaming providers 106. In some embodiments, the CMS 102 may offer various network-based (or "cloud-based") services to the content providers 104, the streaming providers 106, and/or the customers 108 to fulfill computing needs of the content providers 104, the streaming providers 106, and/or the customers 108. The CMS 102 may operate service provider networks that include clusters of managed servers (or other hardware-based computing devices) stored in data centers located across different geographic regions. Users of the CMS 102 can request that the CMS 102 allocate computing resources in these data centers to support computing workloads on behalf of the content providers 104, the streaming providers 106, and/or the customers 108. One or more services of the CMS 102 can receive these requests and allocate physical computing resources to support the workloads, such as usage of computer processors, memory, storage drives, computer network interfaces, and/or other hardware resources of a computing device, for the user.

In certain embodiments, the CMS 102 may utilize virtualization technologies such that the computing devices can each host multiple virtual machine (VM) instances that appear and operate as independent computing devices to support workloads of users. Rather than allocating all of the computing resources of a physical computing device to support a single workload for a user, the computing resources of a physical computing device can be allocated amongst multiple VM instances that support different workloads. The CMS 102 supports many different types of workloads on behalf of users, and these workloads often have different computing resource needs. A workload may be implemented by a designated set of computing resources and the workload itself can be considered as code or logic that performs functionality using the computing resources. The CMS 102 may support a wide variety of workloads, such as web servers, databases, customer-facing applications, distributed datastores, batch processing, machine/deep learning training and/or inference, online gaming, video encoding, memory caching, and/or any other type of workload that can be supported by computing resources of the CMS 102.

In some embodiments, the CMS 102 may be associated with one or more computing architectures, and one or more of the computing architectures may be implemented in a distributed or non-distributed computing environment. The computing architecture may include one or more processors and one or more computer readable media that stores various modules, applications, programs, or other data. The computer-readable media may include instructions that, when executed by the one or more processors, cause the processors to perform the operations described herein. That is, the CMS 102 may include one or more processors, memory, logic, components, modules, computer-executable instructions, etc. that facilitate operations performed by the CMS 102, as described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

A large amount of data transmitted via networks and/or the Internet is associated with streaming services offered by the streaming providers 106. Via these streaming services, the streaming providers 106 offer digital content 114 that is streamed from servers of the streaming providers 106 to customer devices 110 of customers 108 of the streaming providers 106. The digital content 114 may be of any type, such as movies, television shows, documentaries, other video files, digital music, audio books, other audio files, image files (e.g., still images, panoramic images, screenshots, etc.) advertisements, digital documents (e.g., PDF files, word processing files, etc.), and so on. Although the term "streaming provider" is used herein, the CMS 102, the streaming provider 106, and/or the CDS 112 need not "stream" the digital content 114. For instance, the digital content 114 may be sent, transmitted, provided, etc. to customer devices 110 of customers 108. As a result, although the streaming provider 106 may stream content to its customers 108, the streaming providers 106 may also be referred to as "content facilitators."

The digital content 114 is provided by content providers 104, which may include writers, creators, authors, publishers, distributors, producers, etc., of the digital content 114. The streaming providers 106 typically maintain a catalog of content that includes digital content items 114 that are offered to customers 108 for consumption via customer devices 110. The customers 108 may access a website, application, mobile application, etc. of the streaming providers 106 in order to search for, select, view, play, consume, etc. the digital content 114. Today, catalogs of such streaming providers 106 include a significant amount of overlapping content 114 such that different streaming providers 106 offer the same content 114 (e.g., a popular movie, popular television shows, etc.) to its customers 108. For streaming providers 106 to onboard digital content 114, such as a movie, each of the streaming providers 106 would need to obtain the rights to the digital content 114 from the content provider 104 of that digital content 114 and then copy the digital content 114 to servers of the streaming providers 106. The streaming providers 106 would also need to update corresponding digital rights management (DRM) servers with the rights that they each acquired such that the digital content 114 can be streamed to customers 108 in a secure manner.

For instance, assume that the same movie is being streamed by two different streaming providers 106 (e.g., first and second streaming providers 106) as two separate streams. Copies of the movie are being stored separately in one or more first servers of the first streaming provider 106 and one or more second servers of the second streaming provider 106. Streaming the movie to customers 108 using memory in two different servers and using two separate streams increases memory requirements for each of the streaming providers 106 and increases the number of bytes/data flowing between servers of the streaming providers 106 (or possibly servers of the CMS 102) to customer devices 110 of the customers 108. This results in increased network traffic, reduced network bandwidth, and possibly increased latency.

In addition to overlap of content 114 among different streaming providers 106, the streaming providers 106 typically use CDNs to stream content 114 to customers 108. If a particular content item 114 (e.g., a popular movie) is being streamed to customers 108 by two different streaming providers 106, though the content 114 is the same, CDN(s) will have to cache the digital content 114 as two different objects since the streaming providers 106 will have used two different keys to keep the digital content 114 secure (e.g., DRM). Moreover, existing systems do not allow for a single centralized service to manage digital content 114 rights with respect to content providers 104, streaming providers 106, and CDNs.

The systems and processes described herein, and the CMS 102 in particular, allows the content providers 104 to extend rights to its digital content 114 to the CMS 102 and multiple, different streaming providers 106, as well as allows the streaming providers 106 to obtain/acquire rights to the digital content 114, such that a single copy of the digital content 114 can be used to stream the digital content 114 to customers 108 of the different streaming providers 106. The systems and processes described herein also allow the digital content 114 to be served securely via a CDS 112 without setting up an external DRM system or duplicating the digital content 114. Moreover, the systems and/processes described herein maintain the security and privacy of the digital content 114 once it has been provided by the content providers 104, and prevents the piracy of the digital content 114 by users or entities that are not authorized to access the digital content 114 (i.e., unauthorized users). For the purposes of this discussion, the CDS 112 may be any type of service, set of servers, platform, etc. that streams, transmits, sends, downloads, or otherwise provides the digital content 114 to customers 108. The CDS 112 may fetch a copy of the digital content 114 to send to a customer 108 of a streaming provider 106, to multiple customers 108 of the same streaming provider 106, multiple customers 108 of different streaming providers 106, and/or to a different streaming provider 106. As stated herein, the CDS 112 may include one or more CDNs, which may correspond to a geographically distributed network of servers (e.g., proxy servers) and data centers associated with the servers. The CDS(s) 112 may be used to transmit, stream, disperse, etc., various types of content to end users and the content distributed to users is typically provided to CDSs 112 (or CDNs or CDN nodes) that are geographically proximate to a location (e.g., a location of a device) at which the content is transmitted.

The CMS 102 connects the content providers 104 of digital content 114 with the streaming providers 106 that stream the digital content 114 to its customers 108. In particular, a content provider 104 may seek to have its digital content 114 provided to customers 108 and streaming services operated by streaming providers 106 may be one way in which this could occur. As a result, the content providers 104 may transmit its digital content 114 to the CMS 102, such as via a secure portal, website, or in any other manner. Upon receiving the digital content 114 from the content provider 104, the CMS 102 may encrypt the digital content 114 (e.g., content encryption 116), such as by encrypting the digital content 114 using a master key that is associated with the content provider 104. The CMS 102 may store the copy of the digital content 114 in content storage 118, which may be one or more databases, datastores, etc. that provide for secure storage of the digital content 114. The content storage 118 may include different portions associated with different content providers 104 such that digital content items 114 of the same content provider 104 are stored together. The keys used to encrypt/decrypt the digital content 114 may be stored in security storage 120, which may securely store the keys in one or more databases, datastores, etc. In certain embodiments, the term "customer" or "customers" may not be limited to end users or customers of a streaming provider 106. For instance, the customer(s) 108 may also refer to other streaming providers 106. For instance, assume that a first streaming provider 106 offers digital content 114 in which a second streaming provider 106 would like to obtain rights to. Via the CMS 102, the second streaming provider 106 can obtain rights to the digital content 114. Using the processes described herein, the CMS 102 and the CDS 112 may cause the digital content to be provided to the second streaming provider 106 and, in this scenario, the second streaming provider 106 may be considered to be the customer 108.

In addition to providing the digital content 114, the content provider 104 may provide one or more content metadata templates 122 (CMTs) associated with the digital content 114 to the CMS 102. For the purposes of this discussion, a CMT 122 may also be referred to as a "license," a "content license," or a "digital content license." A CMT 122 for a digital content item 114 may indicate terms of use of the digital content item 114 as specified by the content provider 104. For instance, via the CMT 122, the content provider 104 may specify how and when the digital content item 114 is to be used/accessed by others, including the streaming providers 106. The content provider 104 may provide a single CMT 122 or multiple CMTs 122 that vary from one another with respect to their terms. Moreover, a CMT 122 may refer to an entirety of content 114 (e.g., a movie, a television series, a music album, a song, etc.) or a portion of content 114, such as a portion of a movie (e.g., five minutes of the movie), an episode of a television series, a song of a music album, a portion or snippet of a song (e.g., 10 seconds of a song), and so on. The content provider 104 may indicate whether an entirety of a digital content 114, or a portion of the digital content item 114 that is less than the entirety, is available to be licensed to streaming providers 106. The content provider 104 may specify terms for the entirety of the digital content item 114, as well as terms for portions of the digital content item 114 (e.g., a price for each song). Terms of a CMT 122 may include a description of the digital content 114, a duration of use of the digital content 114 (e.g., one year, two years, five years, etc.), an extent of use of the digital content 114 (e.g., when and how the digital content 114 can be provided to customers 108), field of use, geography (e.g., where the digital content 114 can be used), a cost/price to use the digital content 114, an exclusivity of the digital content 114 (e.g., whether use of the digital content 114 is exclusive or non-exclusive), an identity of the content provider 104, whether the digital content 114 is authorized to be sub-licensed, whether modification of the digital content 114 is authorized, termination of the CMT 122, confidentiality provisions, and so on. In other embodiments, the CMTs 122 may be generated by the CMS 102. Regardless, the CMT(s) 122 associated with a digital content item 114 may be stored in a CMT datastore 124 maintained by the CMS 102.

The CMS 102 may make the digital content 114 and the corresponding CMT(s) 122 accessible to streaming providers 106 via a web site, platform, portal, etc. maintained by the CMS 102. The streaming providers 106 may browse the digital content 114 maintained by the CMS 102 and determine the terms of use of the digital content 114 by reviewing the corresponding CMT(s) 122. Via the site/platform maintained by the CMS 102, a streaming provider 106 may obtain rights to a digital content item 114 by selecting the digital content item 114 and its CMT 122. If only one CMT 122 is associated with the digital content item 114, the streaming provider 106 agrees to the terms set forth in the CMT 122. However, if multiple CMTs 122 are associated with a digital content item 114, the streaming provider 106 may select which CMT 122 it prefers. The different CMTs 122 may vary with respect to price/cost, exclusivity, duration of use, etc. For instance, a first CMT 122 for a digital content item 114 may correspond to one-year non-exclusive rights to the digital content item 114 for $100,000, and a second CMT 122 for the same digital content item 114 may correspond to three-year exclusive rights to the digital content item 114 for $2,000,000. Once the streaming provider 106 selects a digital content item 114 and a corresponding CMT 122, the streaming provider 106 has acquired rights to the digital content item 114 pursuant to the terms of the selected CMT 122 (e.g., content rights agreement 126). As described in additional detail here, the content provider 104 and the streaming provider 106 may negotiate the terms of the CMT 122 for a digital content item 114 via the centralized CMS 102.

As a result, the CMS 102 connects content providers 104 of digital content 114 with streaming providers 106 that stream the digital content 114 to its customers 108. The CMS 102 allows the content providers 104 to list their digital content 114 and associate one or multiple CMTs 122 with each digital content item 114. Apart from listing the digital content 114 and corresponding CMT(s) 122, the content providers 104 are also given secure storage (e.g., the content storage 118) where their digital content 114 can be securely stored by the CMS 102. Each digital content item 114 provided to the CMS 102 may be encrypted with a different key and the keys may also be securely stored (e.g., in the security storage 120).

The CMS 102 may also allow the streaming providers 106 to search a catalog of digital content items 114 maintained by the CMS 102 (and provided by the content providers 104) and browse the available CMTs 122 associated with those digital content items 114. As stated above, the digital content items 114 may be provided by the content providers 104. However, the content provider 104 may also be the CMS 102 (or an entity associated therewith) and/or the streaming providers 106. For instance, the CMS 102 or the streaming provider 106 may be the creator of the digital content 114. As a result, the CMS 102 and/or a streaming provider 106 may create original content 114 and license that content 114 to different streaming providers 106. Regardless of the source of the digital content 114 (e.g., the CMS 102, the content providers 104, and/or the streaming providers 106), the streaming providers 106, via the CMS 102, may acquire the rights to a digital content item 114 immediately by selecting one of the CMTs 122, where the selection indicates an intent to acquire the rights to the digital content item 114. If the streaming provider 106 did not identify a suitable CMT 122 for a digital content item 114 that is of interest, the services provided by the CMS 102 may allow the streaming provider 106 to bid on the digital content item 114 with their own custom defined CMT 122. The streaming provider 106 may offer a CMT 122 with revised terms (e.g., modifications to duration, price, exclusivity, etc.). The content provider 104 of that digital content item 114 may review the custom defined CMT 122 provided by the streaming provider 106 and can either approve or reject the modified terms. If the content provider 104 approves of the custom defined CMT 122, the content provider 104 agrees to extend rights to the digital content item 114 pursuant to the terms offered by the streaming provider 106. Otherwise, the content provider 104 may elect to provide a counteroffer or proposal with revised terms. Via the CMS 102, the content provider 104 and the streaming provider 106 may negotiate terms of the CMT 122 until an agreement is reached (or not). As a result, the platform or site maintained by the CMS 102 allows for a fast, seamless negotiation of the rights to use digital content items 114.

As shown, the CMS 102 may maintain, or at least have access to, multiple databases or datastores that securely stores various type of data. However, the data may also be stored in a single database or datastore maintained by the CMS 102. The content storage 118 may store copies of the digital content items 114 themselves, the security storage 120 may store keys, tokens, certificates, etc. that are used to encrypt, decrypt, or otherwise preserve the security of the digital content items 114, and the CMT datastore 124 may store the CMT(s) 122 associated with the digital content items 114. Any of these databases or datastores may also store any type of information about the content providers 104 and/or the streaming providers 106. When a streaming provider 106 agrees to a CMT 122 for a digital content item 114 and acquires rights to use that digital content item 114, the CMS 102 may populate that information to (or copy that information to) the CMT datastore 124. The CMS 102 may also generate/create a certificate that represents the content rights agreement 126 with respect to the CMT 122, the digital content item 114, the content provider 104 of that digital content item 114, and the streaming provider 106 that acquired the rights to use the digital content item 114. The certificate(s) may be stored in the content storage 118, the security storage 120, and/or the CMT datastore 124 and may be made available to the streaming provider 106 and possibly one or more CDSs 112 that are to be used to provide the digital content item 114 to customers 108 of the streaming provider 106. After the streaming provider 106 acquires the CMT 122 for the digital content item 114, the digital content item 114 may be made available to the streaming provider 106, which may initiate the onboarding process of adding that digital content item 114 to its server(s)/database(s). Once the digital content item 114 has been onboarded, the digital content item 114 may be offered to customers 108 of the streaming provider 106 via a web site, application, mobile application, etc. hosted by the streaming provider 106.

Once the streaming provider 106 has made the digital content item 114 available via its website, application, mobile application, etc., customers 108 of the streaming provider 106 may search for, browse, and select content that is available to be streamed, including the recently acquired digital content item 114. Via the site/application hosted by the streaming provider 106, the customer 108 may submit a customer request 128 for the digital content item 114. For instance, via his/her customer device 110, the customer 108 may request that the digital content item 114 be played, rendered, etc., via the customer device 110 (or a different customer device 110). For the purposes of this discussion, the customer 108 may include any individual that has agreed to streaming services provided by the streaming provider 106. For instance, the customers 108 may pay a monthly or yearly fee in order to stream digital content offered by the streaming provider 106. Moreover, the customer 108 may use any customer device 110 to interact with the streaming provider 106 and consume content offered by the streaming provider 106. Example customer devices 110 may include desktop computers, laptop computers, mobile telephones (e.g., smartphones), tablet computing devices, electronic book (eBook) reader devices, gaming consoles, or any other type of electronic device.

Upon receiving the customer request 128, the streaming provider 106 may provide the customer request 128, which may identify the requested digital content item 114, to the CMS 102 and/or the CDS 112. Prior to sending the customer request 128, the streaming provider 106 may verify that the customer request 128 is from a customer 108 of the streaming provider 106, such as by verifying credentials of the customer 108 (e.g., a username and password). The customer credentials may also be provided to the CMS 102/CDS 112 by the streaming provider 106. Prior to providing or streaming the requested digital content item 114 to the customer device 110 of the customer 108, the CDS 112 may validate the customer 108 (e.g., validation 130), which may be based on the customer credentials provided by the streaming provider 106. If validation 130 of the customer 108 fails, the CDS 112 will not allow the digital content 114 to be streamed to the customer device 110 of the customer 108.

However, if the customer 108 is in fact validated, the CDS 112 will perform an enforcement 132 with respect to the streaming provider 106. In particular, the CDS 112 will retrieve the CMT 122 agreed upon between the content provider 104 and the streaming provider 106 with respect to the digital content item 114 and ensure that the streaming provider 106 has rights to the digital content item 114 pursuant to the CMT 122. For instance, the CDS 112 may verify that the customer request 128 for the digital content item 114 is prior to an expiration time specified in the CMT 122. That is, the CDS 112 may enforce the CMT 122 to authenticate the streaming provider 106 with respect to the digital content item 114. For the purposes of this discussion, the validation 130 of the customer 108 and the enforcement 132 with respect to the streaming provider 106 is discussed in additional detail herein. As illustrated in FIG. 1, the validation 130 of the customer 108 and the enforcement 132 of the CMT 122 to authenticate the streaming provider 106 are performed by the CDS 112. However, the CMS 102 or a combination of the CMS 102 and the CDS 112 may perform such operations.

Upon performing the validation 130 and the enforcement 132, the CMS 102 and/or the CDS 112 may generate a temporary key for the digital content item 114 and store the temporary key in the security storage 120. The temporary key may also be provided to the customer device 110 that is to play/render the digital content item 114. Then, the CMS 102 and/or the CDS(s) 112 decrypts the digital content item 114 using the master key that was initially used to encrypt the digital content item 114. The CMS 102 and/or the CDS(s) 112 then re-encrypts the digital content item 114 using the temporary key and the CMS 102 and/or the CDS(s) 112 provides the digital content item 114 to the customer device 110. The customer device 110 may decrypt the digital content item 114 using the previously received temporary key and initiates playback of the digital content item 114. Therefore, instead of each streaming provider 106 providing different copies of a digital content item 114 to its customers 108 (or via a CDS 112), the CMS 102 may allow for streaming of the digital content 114 to customers 108 of different streaming providers 106 using a single copy of the digital content item 114 maintained by the CMS 102. Although the digital content item 114 may be sent to and replicated at the CDS(s) 112, a single copy of the digital content item 114 is used for all streaming providers 106 that have acquired rights to the digital content item 114 via the CMS 102.

In various embodiments, the CMS 102 may include one or more modules, components, computer-executable instructions, logic, etc. associated with CMT compliance 134. In particular, the CMS 102 may perform CMT compliance 134 with respect to different CMTs 122 for different digital content items 114. Performing CMT compliance 134 may correspond to ensuring compliance and consistency between CMTs 122, and terms of the CMTs 122, for a particular digital content item 114, and to make sure that a CMT 122 for the digital content item 114 does not conflict with other CMTs 122, or potential CMTs 122, for that same digital content item 114. More particularly, the CMS 102 may ensure that terms of a CMT 122 for the digital content item 114 do not conflict with other terms in other current or proposed CMTs 122 for that digital content item 114. For instance, the CMS 102 may determine that a first CMT 122 for a digital content item 114 provides for exclusivity, meaning that the streaming provider 106 that acquired the rights to the digital content item 114 may use the digital content item 114 exclusively, either entirely or within a geographic region. That is, an exclusive CMT 122 for the digital content item 114 means that others cannot obtain rights to the digital content item 114 while that exclusive CMT 122 is valid and not expired. The CMS 102 may be aware of the terms of a CMT 122 for the digital content item 114, such as exclusivity, and prevent others from acquiring rights to the digital content item 114. Provided that exclusivity was granted for the digital content item 114, this would mean that the CMS 102 would not accept any other CMTs 122 for the digital content 114 while the current, exclusive CMT 122 is valid. Once the exclusive CMT 122 expires, the CMS 102 may allow others to acquire rights to that digital content item 114.

Although digital content 114 including movies, television shows, digital music, documentaries, etc., is described herein, in an additional embodiment, the digital content 114 may include an advertisement (e.g., a video file, an audio file, etc.). In this scenario, a single advertisement may be stored by the CMS 102 and then inserted into other content (e.g., video data, audio data, etc.). For instance, the advertisement may be maintained by the CMS 102 as a single encrypted file, and the single copy of the advertisement may be inserted into a different video/audio file. If a video/audio file is encoded with advertisements between segments of the video/audio file, the single copy of the advertisement may be replicated prior to encoding/insertion.

Figure 2:
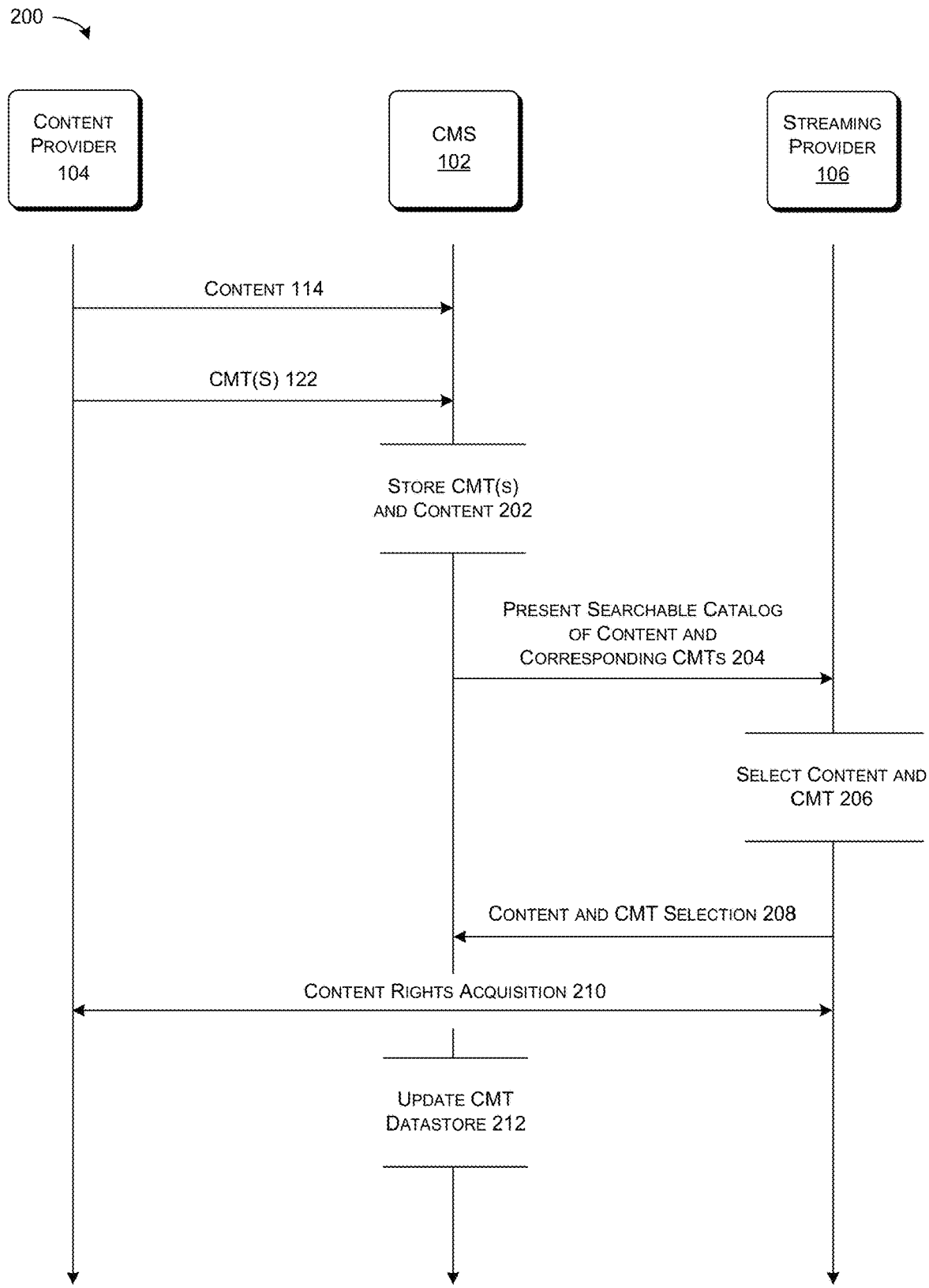
FIG. 2 is a schematic diagram of an illustrative process of a centralized content management service facilitating the acquisition of rights to digital content between a content provider and a streaming provider.

FIG. 2 is a schematic diagram 200 of an illustrative process for facilitating the acquisition of rights for a digital content item between a content provider of the digital content item and a streaming provider that is to stream the digital content item to its customers. As illustrated, the diagram 200 includes the CMS 102, the content provider 104, and a streaming provider 106.

A content provider 104 of digital content 114 may desire to make that digital content 114 available to one or more streaming providers 106. Instead of negotiating rights to the digital content 114 with each individual streaming provider 106, the content provider 104 may transmit a copy of a digital content item 114 to the CMS 102, which is a centralized service, website, platform, etc. that is accessible by both content providers 104 and streaming providers 106. Upon receipt of the digital content item 114, the CMS 102 may encrypt and store the digital content item 114, such as in the content storage 118. In some embodiments, the content provider 104 may be the CMS 102 or the streaming provider 106. For instance, the CMS 102 may have created the digital content item 114 and desires to negotiate rights to the digital content item 114 with streaming providers 106. Moreover, a streaming provider 106 may have created the digital content item 114 and other streaming providers 106 may desire to stream that digital content item 114 to its customers 108. In the latter embodiment, the content provider 104 will be one of the streaming providers 106, and the CMS 102 will serve as an intermediary for the negotiation of rights for the digital content item 114 between streaming providers 106. That is, a streaming provider 106 may desire to obtain rights to a digital content item 114 of a content provider 104 or a different streaming provider 106 such that the streaming provider 106 is authorized to stream that digital content 114 to its customers 108. Instead of negotiating with each content provider 104, the streaming provider 106 may obtain rights to different digital content items 114 via a single source (i.e., the CMS 102).

Regardless of whether the content provider 104 illustrated in FIG. 2 is the CMS 102, a streaming provider 106, or a different individual/entity (e.g., one that created, authored, published, distributed, etc. the digital content item 114), the content provider 104 and/or the CMS 102 may generate or select one or more CMT(s) 122 for the digital content item 114. As described herein, a CMT 122 may specify terms for acquiring the rights to use digital content items 114, such as duration of use, price, exclusivity, geography, and so on. The content provider 104 may provide a single CMT 122 or multiple CMTs 122 to the CMS 102. Upon generating the CMT(s) 122 or receiving the CMT(s) 122 from the content provider 104, the CMS 102 may store the CMT(s) 122 in the CMT datastore 124 (e.g., store CMT(s) 122 and content 202). Each CMT 122 may be stored in association with its corresponding digital content item 114, and digital content items 114 and corresponding CMTs 122 may be stored together in association with the same content provider 104.

The CMS 102 may present a searchable catalog of content and corresponding CMTs at 204. That is, the CMS 102 may provide a platform, website, portal, etc. where streaming providers 106 may view, search for, browse, etc., digital content items 114 in which the streaming providers 106 would like to add to their catalog of content items 114. For instance, a particular streaming provider 106 may desire to offer a specific movie or television series to its customers 108, and may search the catalog of content items 114 maintained by the CMS 102 for that movie/television series. In some embodiments, the CMS 102, or an auxiliary service, may provide recommendations to the streaming providers 106. For instance, the CMS 102 may identify and recommend digital content 114 that is most popular amongst customers 108 (e.g., the top ten most popular movies). Further, the CMS 102 may, for individual streaming providers 106, identify the most frequently requested, viewed, and/or accessed content 114 that does not appear in the catalogs of the streaming providers 106, and then offer or recommend those digital content items 114 to the streaming providers 106. Upon identifying that digital content item 114, the streaming provider 106 may review the CMT(s) 122 corresponding to that digital content item 114. The CMT(s) 122 may specify terms of use for acquiring rights to the digital content item 114. That is, the CMT(s) 122 may indicate terms that the streaming provider 106 would have to agree to in order to acquire the rights to the digital content item 114.

At 206, the streaming provider 106 selects content and CMT 206. In some embodiments, provided that a single CMT 122 accompanied the digital content item 114, the streaming provider 106 may, via the CMS 102, select the digital content item 114 and the CMT 122. Selection of the CMT 122 indicates an intent to acquire the rights to the digital content item 114 pursuant to the terms set forth in the CMT 122. However, if the digital content item 114 is associated with multiple CMT(s) 122, the streaming provider 106 may select the CMT 122 that is of interest to the streaming provider 106. A first CMT 122 may be for non-exclusive rights to the digital content item 114 for one year for $200,000, a second CMT 122 may be for non-exclusive rights to the digital content item 114 for three years for $1,000,000, and a third CMT 122 may be for exclusive rights to the digital content item 114 for three years for $3,000,000. The streaming provider 106 may select any of these CMTs 122 and acquire the rights to the digital content item 114 at those terms.

Upon the streaming provider 106 making a selection of a CMT 122 via the CMS 102, at 208, the content and CMT selection is received by the CMS 102. The agreement between the content provider 104 and the streaming provider 106 regarding the CMT 122 may be referred to as a content rights acquisition 210 with respect to the digital content item 114. The CMS 102 may update the content storage 118 and/or the CMT datastore 124 to reflect that the streaming provider 106 has acquired the rights to the digital content item 114 and the CMS 102 may store the selected CMT 122 in association with that digital content item 114. This process may be referred to herein as update CMT datastore 212. Upon acquiring the rights to use the digital content item 114 (e.g., stream the digital content item 114 to its customers 108), the streaming provider 106 may update its catalog of content to reflect that the digital content item 114 is now available for streaming to customers 108.

Currently, the process of negotiating the rights to use a digital content item 114 is a manual process between the content provider 104 of the digital content item 114 and the streaming providers 106. The two parties must physically negotiate the terms of the license for the digital content item 114, such as via a physical meeting, telephone calls, an exchange of e-mail messages, and so on. The CMS 102, however, provides for an automated process for a streaming provider 106 to obtain rights to digital content items 114. In particular, the CMS 102 provides a centralized site, platform, etc. in which content providers 104 can provide the digital content items 114 and corresponding CMTs 122 and streaming providers 106 may search for, browse, and review the digital content items 114 and select an appropriate CMT 122 that best suits its interests/preferences. Upon selection of a CMT 122 by the streaming provider 106 via the CMS 102, an agreement to acquire the rights to the digital content item 114 pursuant to the terms of the selected CMT 122 occurs automatically.

Figure 3:
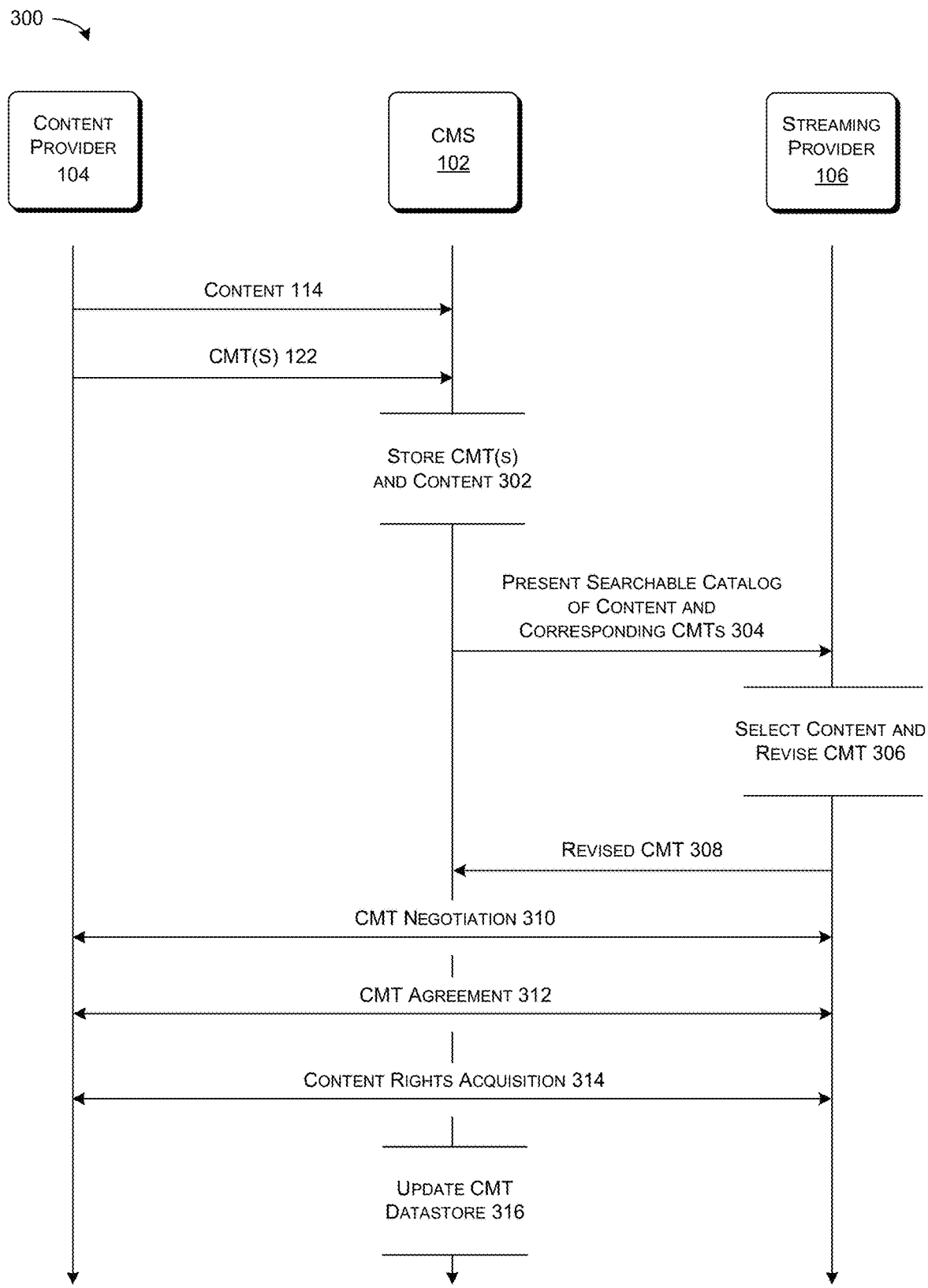
FIG. 3 is a schematic diagram of an illustrative process of a centralized content management service facilitating the acquisition of rights to digital content between a content provider and a streaming provider via a negotiation with respect to content metadata templates.

FIG. 3 is a schematic diagram 300 of an illustrative process for facilitating the acquisition of rights for a digital content item between a content provider of the digital content item and a streaming provider that is to stream the digital content item to its customers. As illustrated, the diagram 300 includes the CMS 102, the content provider 104, and a streaming provider 106. The process illustrated in FIG. 3 is similar, if not identical, to the process illustrated in FIG. 2 with respect to the content provider 104 providing the content 114 and the CMT(s) 122 to the CMS 102. Moreover, storing the CMT(s) 122 and the content 302 and presenting the searchable catalog of content and corresponding CMTs 304 are similar to reference numbers 202 and 204, respectively.

However, instead of the streaming provide 106 selecting one of the CMTs 122 that are displayed in association with the digital content item 114, the streaming provider 106 may still select the digital content item 114 but may elect to offer different terms for the CMT 122 (e.g., select content and revise CMT 306). Here, the streaming provider 106 may deem the terms of the CMT(s) 122 to be unfavorable. As a result, the streaming provider 106 may, via the CMS 102, modify one or more terms of the CMT 122, propose new/ different terms for the CMT 122, or provide/upload a custom CMT 122. In some embodiments, instead of acquiring the rights to an entirety of a digital content item 114, the streaming provider 106 may desire to acquire rights to a portion of the digital content item 114, such as a scene or clip from a movie, an episode of a television series, a few seconds of a song (e.g., for a commercial or other advertisement), a meme (e.g., an image, video, or piece of text from the digital content item 114), and so on. Since the terms of the CMT(s) 122 may relate to an entirety of the digital content item 114, the streaming provider 106 may desire to propose different terms (e.g., a lower price, a shorter duration, etc.) to acquire rights to a portion of the digital content item 114. The streaming provider 106 may make a counteroffer or counterproposal that modifies one or more terms of the CMT 122, such as duration of use of the digital content item 114 (e.g., increase duration from one to two years), price (e.g., reduce price), exclusivity (e.g., change from non-exclusive use to exclusive use), and so on. The revised CMT 308 may then be provided to, and received by, the CMS 102.

Via the CMS 102, the content provider 104 and the streaming provider 106 may engage in CMT negotiation 310 with respect to the terms of the CMT 122. For instance, the content provider 104 may accept the revised terms and thereby enter into a CMT agreement 312 with the streaming provider 106 regarding the rights to the digital content item 114. Alternatively, the content provider 104, via the CMS 102, may reject the revised terms of the CMT 122, resulting in no agreement. Further still, the content provider 104, via the CMS 102, may provide an additional counteroffer or counterproposal regarding terms of the CMT 122 to the streaming provider 106. The negotiation of the CMT 122 terms via the CMS 102 may continue until the CMT agreement 312 is reached, or until no agreement is reached. Upon reaching an agreement regarding the terms of the CMT 122, a content rights acquisition 314 may occur between the content provider 104 and the streaming provider 106 with respect to the digital content item 114. Then, like reference number 212 illustrated in FIG. 2, the CMS 102 may update the CMT datastores 316 to indicate that the streaming provider 106 has acquired rights to the digital content item 114 and to store the CMT 122 agreed upon by the content provider 104 and the streaming provider 106. As a result, the CMS 102 provided a centralized location at which the content provider 104 and streaming providers 106 can negotiate the acquisition of rights for digital content items 114 of the content provider 104.

Accordingly, the CMS 102 may maintain a database of digital content items 114 that is accessible and searchable by streaming providers 106 that are interested in streaming digital content 114 to its customers 108. Along with each of the digital content items 118 are one or more CMT(s) 122 that dictate terms for acquiring the rights to the digital content items 118. In some embodiments, a streaming provider 106 may identify, in the catalog of content 114 maintained by the CMS 102, a digital content item 114 in which the streaming provider 106 does not have rights to but that the streaming provider 106 would like to stream to its customers 108. Upon identifying the digital content item 114 via the CMS 102, there may be one or more CMTs 122 associated with the digital content item 114 that the content provider 104 has agreed to. The streaming provider 106 may select one of the CMTs 122 and acquire rights to the digital content item 114 pursuant to the terms of the selected CMT 122. Selection of the CMT 122 and acquisition of the rights to the digital content item 114 is an automated process that does not require direct communication between the content provider 104 and the streaming provider 106 (e.g., the CMS 102 serves as the intermediary). The content provider 104 may receive a notification of the selection of the CMT 122 regarding the acquisition of rights to the digital content item 114. However, in other embodiments, the streaming provider 106 may not like the terms included in any one of the CMTs 122 for the digital content item 114. The streaming provider 106 may provide modified terms of the CMT(s) 122 via the site/platform maintained by the CMS 102, which may cause the CMS 102 to send a notification to the content provider 104. The content provider 104 may, via the CMS 102, accept the modified terms and enter into an agreement with the streaming provider 106 or continue to negotiate the terms of the CMT 122 via the CMS 102. Regardless of the agreed upon terms, upon agreement to the CMT 122, the streaming provider 106 may update its systems to reflect that the acquired digital content item 114 is now available to its customers 108 for streaming.

Figure 4:
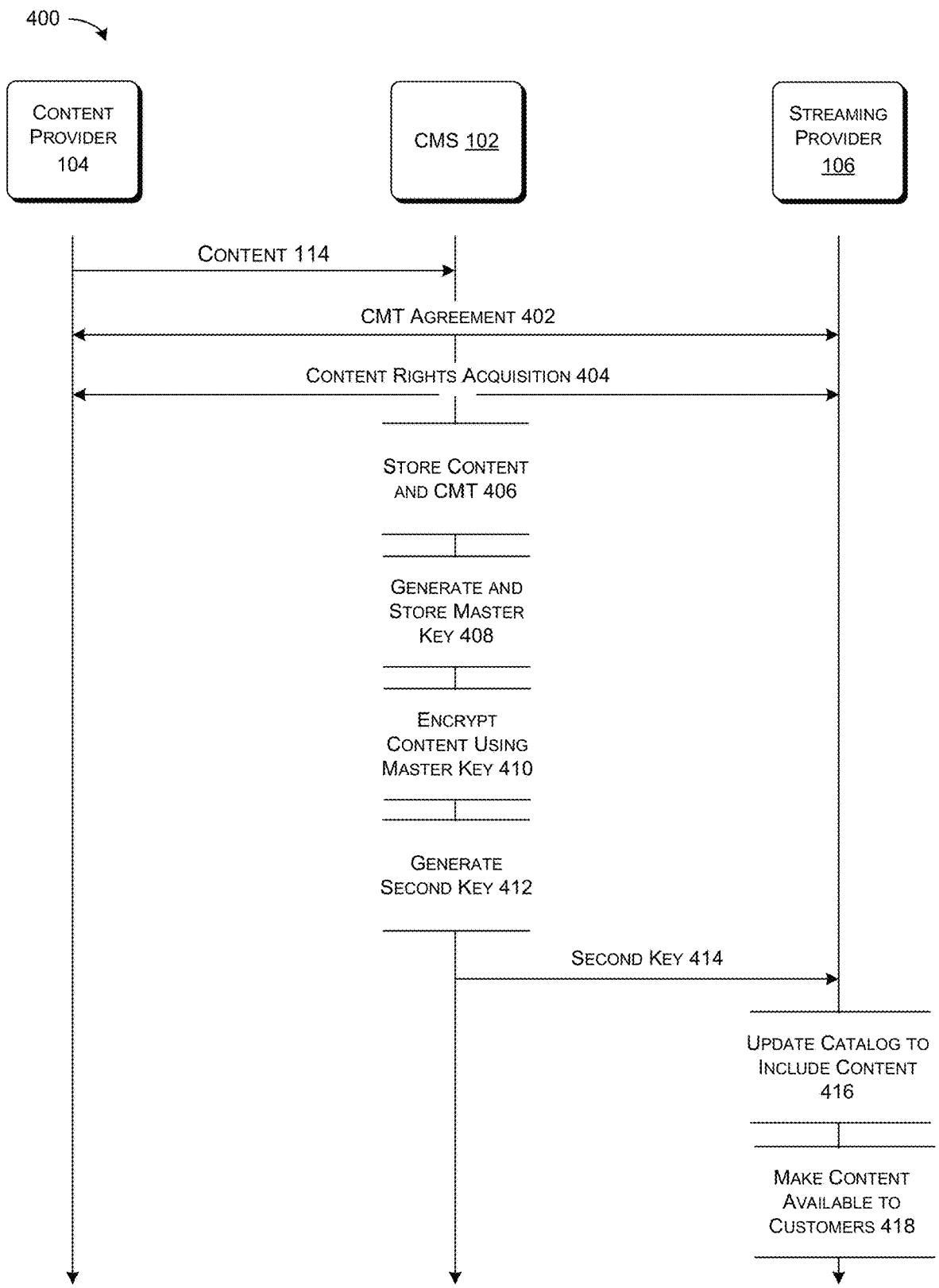
FIG. 4 is a schematic diagram of an illustrative process of a centralized content management service facilitating the storage of content provided by a content provider and the encryption/decryption of the content with respect to a streaming provider that is to offer the content to customers.

FIG. 4 is a schematic diagram 400 of an illustrative process for facilitating the process of a streaming provider acquiring rights to digital content provided by a content provider. As illustrated, the diagram 400 includes the CMS 102, a content provider 104, and a streaming provider 106.

As discussed above with respect to FIGS. 2 and 3, the content provider 104 may send or upload digital content 114 to the CMS 102 (or one or more servers associated with the CMS 102). Via a site, platform, etc. hosted by the CMS 102, the content provider 104 and the streaming provider 106 may come to an agreement with respect to a CMT 122 for the digital content 114 (e.g., CMT agreement 402). That is, via the CMS 102, the streaming provider 106 may obtain rights to the digital content 114 such that the streaming provider 106 is authorized by the content provider 104 to use the digital content 114 pursuant to the terms of the agreed upon CMT 122 (e.g., content rights acquisition 404). Upon receiving the digital content 114 and determining the CMT 122 agreed upon by the content provider 104 and the streaming provider 106, the CMS 102 may store the digital content 114 and the CMT 122 in one or more databases or datastores (e.g., the content storage 118, the CMT datastore 124, etc.) that are maintained by one or more servers associated with the CMS 102 (e.g., store content and CMT 406).

Either before or after the streaming provider 106 acquires rights to the digital content 114 via the CMT 122, and possibly when the digital content 114 is received from the content provider 104, the CMS 102 may generate and store a master key 408 (also referred to herein as a "master encryption key"). The master key may be associated with the digital content 114 and maintained by the CMS 102 in the security storage 120, or in any other database, datastore, etc., maintained by the CMS 102. The master key, and any other encryption key described herein, are used to encrypt and decrypt data, such as the digital content 114. For the purposes of this discussion, an encryption key may be a random string of bits that are generated specifically to scramble and unscramble data. An encryption key may also be referred to as a piece of information (e.g., a parameter) that determines the functional output of a cryptographic algorithm. The encryption keys are created using algorithms to ensure that each encryption key is unpredictable and unique with respect to other encryption keys. The longer the encryption key, the more difficult it is to break the encryption code. For encryption algorithms, a key specifies the transformation of plaintext into cyphertext, and vice versa for decryption algorithms. Keys may also specify transformations in other cryptographic algorithms, such as digital signature schemes and message authentication codes. Any type of encryption key is contemplated herein, including 256-bit Advanced Encryption Standard (AES) algorithm keys. Moreover, any type of encryption algorithm may be used by the CMS 102, or an associated encryption key server, to generate the master key, such as symmetric algorithms and/or asymmetric algorithms. Symmetric, or secret key encryption, may use a single key for both encryption and decryption. On the other hand, asymmetric, or public/private encryption, may use a pair of keys, where data encrypted with one of the keys are decrypted only with the other key in the public/private pair. When an asymmetric key pair is generated, the public key is typically used to encrypt the data and the private key is typically used to decrypt the data.

At 410, the CMS 102 may encrypt the digital content 114 using the master key. Using the encryption techniques and/or processes described above, the CMS 102 may encrypt the digital content 114 to provide for security of the digital content 114, and to prevent unauthorized use of the digital content 114. In some embodiments, the master key may be provided to the content provider 104 of the digital content 114. Moreover, an entirety of the digital content 114 may be encrypted with the master key or portions of the digital content 114 may be encrypted using the master key or multiple master keys. For instance, as described in additional detail herein, the digital content 114 may be segmented, chunked, or partitioned into multiple segments or chunks. Each of the segments/chunks of the digital content 114 may be encrypted using the same master key, or different segments/chunks may be encrypted using different master keys. There may be a single master key for a movie or a television episode, there may be multiple master keys for a movie or each television episode, or there may be a single master key for an entire television series having multiple episodes.

At 412, the CMS 102 (or the CDS 112) may generate a second key that is different than the master key. The second key may be generated using the cryptographic algorithms described above, and the second key may be associated with the digital content 114. In some embodiments, the second key may be a public/private key pair that may be used to encrypt and decrypt the digital content 114, or at least portions of the digital content 114. The second key may be provided to the streaming provider 106 at 414. Since the streaming provider 106 has acquired rights to the digital content 114, the second key may be used by the streaming provider 106 to encrypt and/or decrypt the digital content 114. In certain embodiments, only the second key, and not the master key, is provided to the streaming provider 106, and the master key is instead maintained by the CMS 102.

At 416, the streaming provider 106 may update its catalog to include the digital content 414. In particular, now that the streaming provider 106 has acquired rights to the digital content 114, the streaming provider 106 may update its databases, content catalog, website, mobile application, etc. to reflect that the streaming provider 106 may stream the digital content 114 to its customers 108. At 418, the streaming provider 106 may make the digital content 114 available to its customers 108. That is, as a result of browsing, searching, etc. the website/mobile application maintained by the streaming provider 106, customers 108 of the streaming provider 106 may view and play the digital content 114. Since the streaming provider 106 has obtained the rights to stream the digital content 114, customers 108 of the streaming provider 106 have the right to view/play the digital content 114 (e.g., a movie, television episodes, digital music, etc.) via corresponding customer devices 110.

Figure 5:
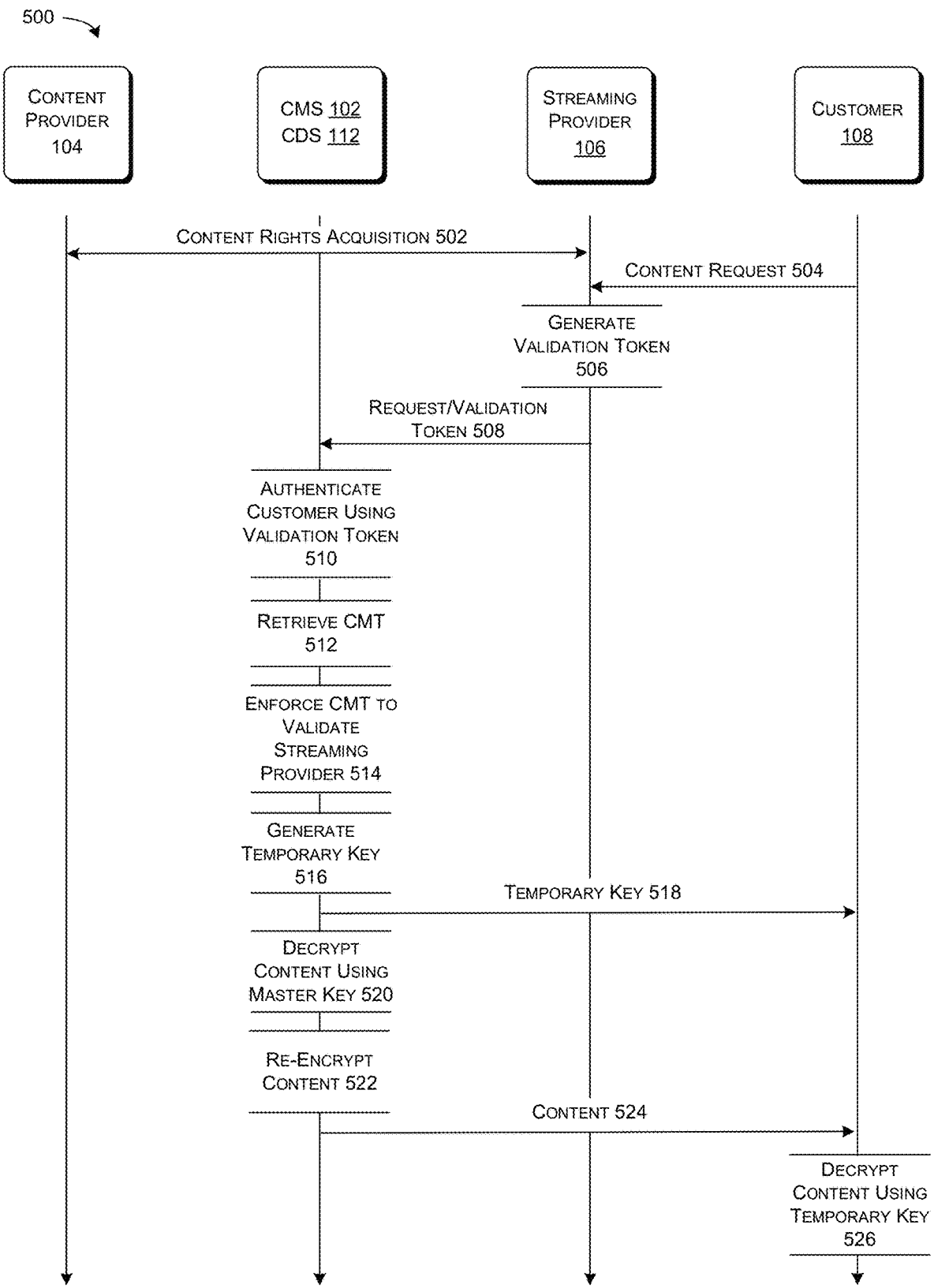
FIG. 5 is a schematic diagram of an illustrative process of a centralized content management service facilitating the customer authentication of a customer that requested content from a streaming provider and the validation of the streaming provider by enforcing a content metadata template associated with the content.

FIG. 5 is a schematic diagram 500 of an illustrative process for facilitating the consumption of digital content of a content provider in which rights have been acquired by a streaming provider. As illustrated, the diagram 400 includes the CMS 102, a content provider 104, a streaming provider 106, and/or a CDS 112.

As described above with respect to FIGS. 2-4, a streaming provider 106 may obtain rights to digital content 114 of a content provider 104 via the CMS 102 as a result of an agreement to a CMT 122 associated with the digital content 114. The streaming provider 106 obtaining such rights may correspond to "content rights acquisition 502." Once the streaming provider 106 updates its system to reflect that the streaming provider 106 now offers the digital content 114 for streaming, customers 108 of the streaming provider 106 may first log in to the streaming provide 106, such as by providing a username and password. The streaming provider 106 may authenticate the customer 108 to confirm that the customer 108 is in fact authorized to access content offered by the streaming provider 106. If so, the customer 108 may select that digital content 114 for consumption. For instance, as a result of a search or browsing the website/mobile application of the streaming provider 106, a customer 108 may select that digital content 114 for viewing or listening (e.g., content request 504). Upon selection of the digital content 114 for viewing/listening via the website/mobile application, the streaming provider 106 may receive the content request 504.

As a result of the customer 108 being authenticated by the streaming provider 106 and the customer 108 submitting the content request 504, the streaming provider 106 may, at 506, generate a validation token that may include a signature (also referred to herein as a "digital signature) and/or a certificate. The validation token may be used to ensure that an end-user (e.g., the customer 108) is authenticated to consume the digital content 114. The validation token is specific to the customer 108 and, at 508, the content request and the validation token are sent from the streaming provider 106 to the CMS 102 and/or the CDS 112. The signature and/or the certificate associated with the validation token may also be sent to the CMS 102/CDS 112. In some embodiments, once the customer 108 provides authentication credentials to the streaming provider 106 and is authenticated, the streaming provider 106 may license a certificate and create the encrypted validation token using the certificate's public key or use a different signature mechanism. For instance, the validation token may be:

Validation_Token=SIGN("STREAMING PROVIDER"+ "MOVIE1"+"TOKEN_EXPIRY"+"CUSTOMER_IP")

In some instances, the customer 108 will supply, via his/her customer device 110, this validation token while streaming the digital content 114 (e.g., the movie).

At 510, the CMS 102 and/or the CDS 112 may authenticate the customer 108 using the validation token. In particular, the CMS 102/CDS 112 may validate the customer 108 using the validation token to verify that the customer 108 is in fact a customer 108 of the streaming provider 106 and to confirm the identity of the customer 108. In some embodiments, the CMS 102/CDS 112 may authenticate the customer 108 using the certificate to sign the validation token. More particularly, since both the CMS 102/CDS 112 and the streaming provider 106 possess the same certificate associated with the customer 108 and the content request 504, when the validation token is received from the streaming provider 106, the CMS 102/CDS 112 can confirm that the content request 504 is associated with the streaming provider 106 as a result of a domain name, which is associated with the content request 504 and/or the validation token. Based on the domain name, the CMS 102/CDS 112 may confirm that the validation token corresponds to the streaming provider 106. Upon determining this, the CMS 102/CDS 112 may retrieve the certificate associated with the streaming provider 106 and authenticate the validation token. If the validation token is authenticated, the CMS 102/CDS 112 knows that the content request 504 is from a customer 108 of the streaming provider 106. Otherwise, the CMS 102/CDS 112 may deny the content request 504 and prevent the customer 108 from consuming the digital content 114 associated with the content request 504.

In some instances, one or more CDS(s) 112 may be used to stream the digital content 114 to the customer device 110 of the customer 108. In that scenario, when the CDS(s) 112 receive the content request 502 for the digital content 114, the CDS(s) 112 may validate the validation token to confirm that the customer 108 is from a registered streaming provider 106 service (e.g., the customer 108 has a valid account or profile with the streaming provider 106) and/or that the token has not expired. To verify the signature, the CDS(s) 112 may require the public key that would be fetched from the certificate, where the certificate will be associated with a CDS 112 configuration of the streaming provider 106.

Provided that the CMS 102 and/or the CDS(s) 112 authenticate the customer 108, which verifies that the end-user is an authorized customer 108 of the streaming provider 106, the CMS 102 and/or the CDS 112 may ensure that the streaming provider 106 is authorized to stream the requested digital content 114 to the customer 108. To do so, at 512, the CMS 102/CDS 112 may retrieve or otherwise access the CMT 122 that was previously agreed upon between the content provider 104 and the streaming provider 106 and that is stored in the CMT datastore 124 (e.g., retrieve CMT 512). In particular, the CMS 102/CDS 112 may identify a content identifier associated with the requested digital content 114, retrieve the CMT 122 corresponding to that digital content 114, and enforce the CMT 122. In some embodiments, a CDS 112 may retrieve the CMT 122 associated with the digital content 114.

At 514, the CMS 102 (and/or the CDS 112) may enforce the CMT 122 to validate the streaming provider 106. Enforcing the CMT 122 may include ensuring that the streaming provider 106 is authorized to stream the requested digital content 114 to the requesting customer 108, as well as other customers 108. The CMS 102/CDS 112 may determine whether the CMT 122 is still valid, such as by determining that the CMT 122 is not expired and/or determining that the streaming provider 106 has not violated any terms of the CMT 122. If the time of the content request 504 (indicated by a timestamp) is prior to an expiration of the CMT 122, the CMS 102/CDS 112 may determine that the streaming provider 106 is authorized to stream the requested digital content 114 to the requesting customer 108. That is, the CMS 102/CDS 112 may enforce the CMT 122 in order to validate the streaming provider 106. If the streaming provider 106 is not validated (e.g., the CMT 122 is expired), the CMS 102/CDS 112 may prevent the customer device 110 of the customer 108 from rendering the requested digital content 114. However, if the streaming provider 106 is validated, then the CMS 102/CDS 112 may initiate playback of the digital content for the customer 108. Provided that the CDS(s) 112 are serving the digital content 114 to the customer device 110, the CDS(s) 112 may obtain the appropriate CMT 122 from the CMS 102. Alternatively, the CDS(s) 112 may maintain a copy of the CMT database 124, which may be synchronized with the CMT database 124 maintained by the CMS 102. As a result, the CDS(s) 112 may readily access the CMTs 122 associated with different digital content items 114.

Provided that the streaming provider 106 is validated at 514, the CMS 102 and/or the CDS(s) 112 may, at 516, generate a temporary key. The temporary key may be different than the master key and the second key and may be of any type, including a symmetric key. The temporary key may correspond to the entirety of the digital content 114, or one or more portions, segments, chunks, etc., of the digital content 114. In addition, each portion, segment, chunk, etc. may have a different temporary key or multiple portions, segments, chunks, etc. of the digital content 114 may be associated with the same temporary key. In some embodiments the temporary key may be associated with a session, which may correspond to an entire movie or television episode, or a portion of that movie/episode (e.g., 10 minutes of the movie/episode).

The duration of the session may be dictated by the streaming provider 106. The digital content 114 may be broken up, chunked, partitioned, segmented, etc. into smaller files (or chunks) to reduce the likelihood of unauthorized access of the digital content 114. The amount and/or size of the chunks of the digital content 114 are configurable by the content provider 104 since it owns, or at least controls access to, the digital content 114. As a result, the content provider 104 may specify the number of keys to apply to the entire digital content 114, as well as to individual chunks of the digital content 114. As a result, each chunk of the digital content 114 may be associated with a single encryption key or multiple encryption keys, and encryption keys may be associated with multiple chunks of the digital content 114. The digital content 114 may be more secure when the digital content 114 is partitioned into a greater number of chunks and/or if there are a greater number of encryption keys associated with the digital content 114. For instance, if the digital content 114 was partitioned into a number of chunks, and an unauthorized user obtained an encryption key for only one of the chunks, the unauthorized user would only have access to that chunk of the digital content 114, as opposed to the entirety of the digital content 114.

At 518, the temporary key(s) may be provided by the CMS 102 and/or the CDS 112 to a customer device 110 of the customer 108 that is to be used to consume the requested digital content 114. The CMS 102/CDS 112 may obtain, fetch, retrieve, etc. the digital content 114 and/or a copy of the digital content 114 from the content storage 118. In other embodiments, the CDS(s) 112 may fetch the encrypted digital content 114 from the content storage 118, and possibly cache the encrypted digital content 114 in local storage of the CDS(s) 112. At 520, the CMS 102 may decrypt the digital content 114 using the master key. Since the CMS 102 encrypted the digital content 114 using the master key to provide for greater security and to prevent unauthorized access, the CMS 102 may have to decrypt the digital content 114 using the master key so that the digital content 114 can be rendered and consumed by the customer device 110 of the customer 108. Otherwise, the digital content 114 could not be rendered by the customer device 110 when streamed to the customer 108. In other embodiments, the CDS(s) 112 may fetch or otherwise obtain the master key from the security storage 120 and decrypt the digital content 114 using the master key. At 522, the CMS 102 and/or the CDS(s) 112 may re-encrypt the digital content 114 using the temporary key (e.g. a symmetrical key). The digital content 114 is re-encrypted to provide for greater security and to reduce the likelihood of unauthorized access when the digital content 114 is streamed to the customer device 110.

At 524, once the digital content 114 has been re-encrypted using the temporary key, the CMS 102 and/or the CDS(s) 112 may stream or serve the encrypted digital content 114 to the customer device 110. At 526, upon receipt of the encrypted digital content 114, the customer device 110 decrypts the digital content 114 using the temporary key previously provided by the CMS 102/CDS 112 (e.g., decrypt content using temporary key 526). As a result of the decryption, the customer device 110 may render/play the digital content 114 for consumption by the customer 108. Since the temporary key may only apply to a portion of the digital content 114, decrypting the digital content 114 using the temporary key may allow the customer 108 to consume only that portion of the digital content 114. The CMS 102/CDS 112 may provide multiple temporary keys to the customer device 110 at a single time, or over time, so that the customer device 110 can decrypt the multiple portions of the digital content 114 for consumption. Accordingly, as described above, the CDS 112, possibly in association with the CMS 102, may perform the operations associated with reference numbers 510-524 illustrated in FIG. 5.

The temporary keys provided to the customer device 110 may be deleted after the customer device 110 plays the digital content 114 for consumption. If the customer 108 desired to view/play the digital content 114 at a later time, the customer 108 may submit an additional content request 504 and the CMS 102/CDS 112 may perform the same or similar operations illustrated in, and described with respect to, FIGS. 4 and 5. However, in some embodiments, the customer device 110 may maintain the temporary keys in storage such that the customer 108 may view/play the digital content 114 at a later time. Once provided to the customer device 110, the temporary key(s) may be provided to other customer devices 110 associated with the customer 108. For instance, if the customer 108 registered a mobile telephone, a laptop computer, and a tablet computing device with his/her account with the streaming provider 106, the temporary key(s) could be shared between such devices. In various embodiments, the content provider 104 may specify preferences regarding the storage, deletion, and sharing of temporary keys associated with the digital content 114. For instance, the content provider 104 may specify that the temporary keys provided to customer devices 110 should be deleted after the digital content 114 is consumed, that the temporary keys can be, or cannot be, shared between multiple customer devices 110, that the temporary keys can be stored and reused by customer devices 110, and so on.

The systems and processes described herein provide for multiple technological benefits and improve the function of various computing devices. For instance, the digital content 114 of the content provider 104 is maintained in an encrypted format until the digital content 114 is decrypted at the customer device 110 for consumption. Maintaining an encrypted version of the digital content 114 will increase the security of the digital content 114 and will decrease, and possibly eliminate, the likelihood of unauthorized access to the digital content 114.

Moreover, the CMS 102 facilitates streaming of the digital content 114 to multiple customers 108 of multiple streaming providers 106 using only a single copy of the digital content 102 stored by the CMS 102. That is, the digital content 114 need not be saved, hosted, and delivered as separate content. A copy of the digital content 114 may be provided to the CDS(s) 112 if they are used to stream/serve the digital content 114 to customers 108. This reduces the amount of data being transmitted across networks, which reduces network congestion/traffic, increases network bandwidth, and reduces latency. Requiring only a single copy of the digital content 114 in storage associated with the CMS 102 also reduces storage requirements for the streaming providers 106. For instance, instead of each streaming provider 106 storing and transmitting different copies of the digital content 114, the digital content 114 is stored and streamed by the CMS 102/CDS(s) 112. The streaming providers 106 need not store the digital content 114, which increases available storage for the streaming providers 106, and which reduces processing power needed to store and retrieve such digital content 114 for streaming to customers 108. The CMS 102/CDS(s) 112 perform such operations on behalf of the streaming providers 106.

As an illustrative example, assume that two different streaming providers 106 both offer and stream the same movie to their customers 108 (or subscribers). In existing systems, a CDN will treat the movie from both of these streaming providers 106 as separate objects. Thus, the same CDN edge node server might obtain the movie from servers of the first streaming provider 106 in order to send the movie to a customer 108 of the first streaming provider 106, even though that CDN edge node server already maintains a second streaming provider 106 copy of the movie that is stored at the CDN edge node server. As a result of the systems and processes described herein, the CDN edge node server can just serve the same copy of the movie to the customer 108 of the first streaming provider 106, as well as to customers 108 of the second streaming provider 106. The CDN edge node server may do so without requiring a network to transfer the payload of the entire movie.

The CMS 102 also provides for a centralized location in which content providers 104 and streaming providers 106 can negotiate rights associated with the digital content 114. In particular, the streaming providers 106 may, via the CMS 102, obtain rights to digital content using an automated process facilitated by the CMS 102, which requires less resources spent by computing devices associated with the content providers 104 and the streaming providers 106.

Figure 6:
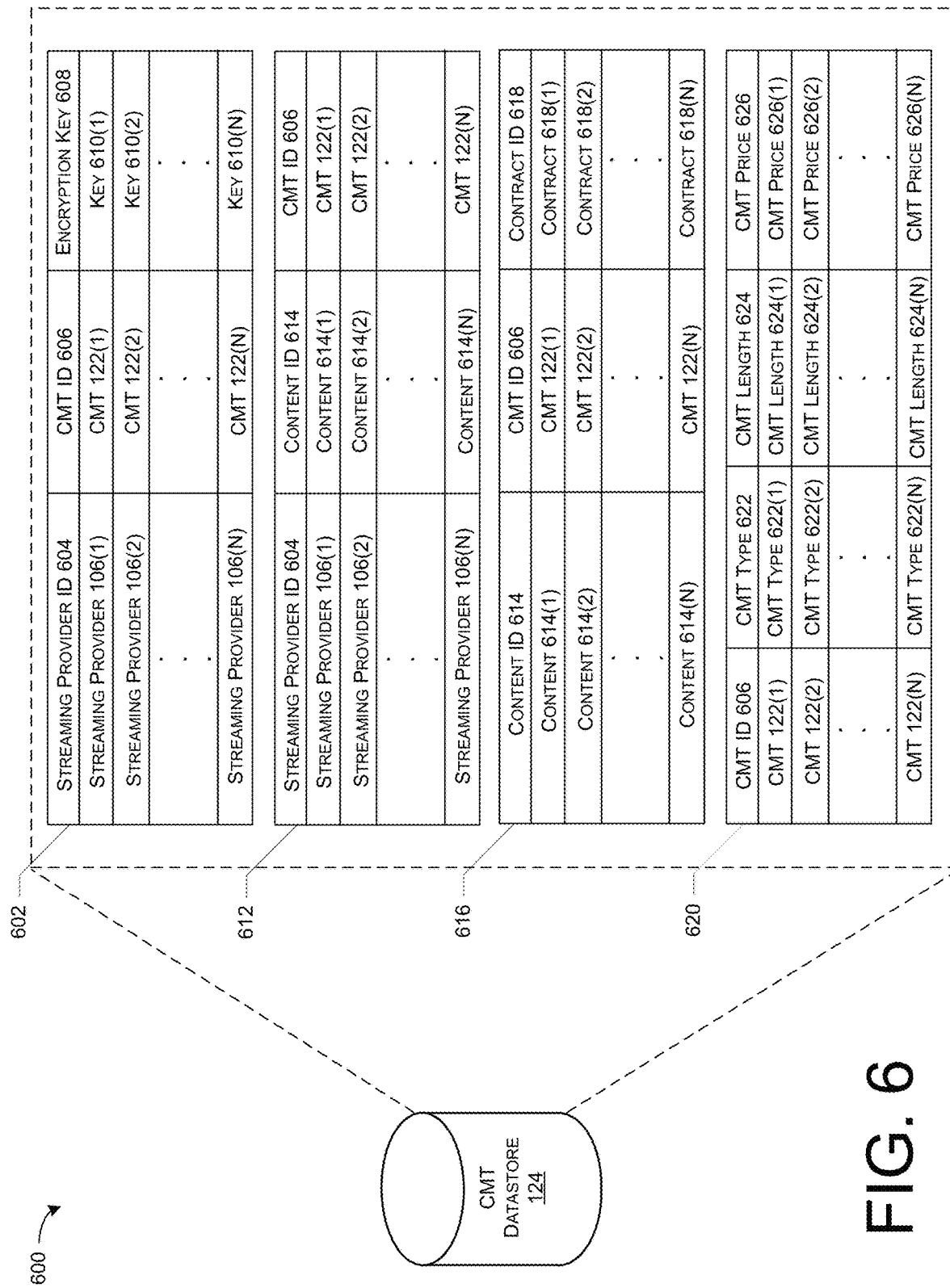
FIG. 6 is a schematic diagram of an illustrative datastore that stores and associates streaming providers, content provided by content providers, and content metadata templates that define rights of the streaming providers to provide the content to customers.

FIG. 6 is a diagram 600 illustrating the CMT datastore, as illustrated in FIG. 1 and as described with respect to FIGS. 1-5. Although the CMT datastore 124 is illustrated in FIG. 6, the content storage 118 and/or the security storage 120 may store similar, if not the same, data. As shown, the CMT datastore 124 may store one or more tables, databases, data structures, etc. (collectively referred to herein as "tables") that include data relating to the digital content 114 provided by content providers 104, data relating to streaming providers 106 that have obtained rights to the digital content 114, and data relating to CMTs 122 for digital content 114 that have been agreed upon by content providers 104 and streaming providers 106. The tables illustrated in FIG. 6 are for illustration purposes only, and any other types of data may be included.

For instance, table 602 includes data associated with streaming providers 106. In particular, the table 602 includes streaming provider identifiers (IDs) 604 associated with different streaming provider 106, CMT IDs 606 representative of CMTs 122 that each of the streaming providers 106 have agreed to, and encryption keys 608 associated with digital content 114 that the streaming providers 106 have provided rights to. For example, the encryption key 608 column includes key 610(1) for streaming provider 106(1), key 610(2) for streaming provider 106(2), and key 610(N) for streaming provider 106(N). Table 612 also includes data associated with the streaming providers 106, such as streaming provider IDs 604, content identifiers 614 representative of digital content 114 that the streaming providers 106 have acquired rights to, and the CMT IDs 606 referenced in table 602. Moreover, table 616 includes data associated with digital content 114 in which rights have been obtained/acquired by streaming providers 106. In particular, table 616 includes content identifiers 614 representative of different digital content 614, CMT IDs 606 that indicate CMTs 122 associated with that digital content, and contract IDs 618 that includes contractual details or terms included in the CMTs 122. The CMT datastore 124 may also maintain table 620, which may include information about CMTs 122 that have been agreed upon between content providers 104 and streaming providers 106. For instance, table 620 may include CMT IDs 606 that are representative of the CMTs 122, CMT type 622 that is representative of the type of CMT 122 (e.g., exclusive, non-exclusive, etc.), CMT length 624 that indicates a duration or length of the CMT 122 (e.g., one year, two years, five years, etc.), and CMT price 626 that indicates a price or cost paid by the streaming providers 106 to obtain the rights to the digital content 114.

The CMS 102 and/or the CDSs 112 may utilize the CMT datastore 124, and the tables stored therein, to identify, retrieve, and/or collect various data relating to the content providers 104, the streaming providers 106, the digital content 114, and the CMTs 122 relating to the digital content 114. For instance, the CMS 102 and/or the CDSs 112 may retrieve copies of digital content 114 for streaming, obtain a CMT 122 to validate or authenticate a streaming provider 106, and so on.

Figure 7:
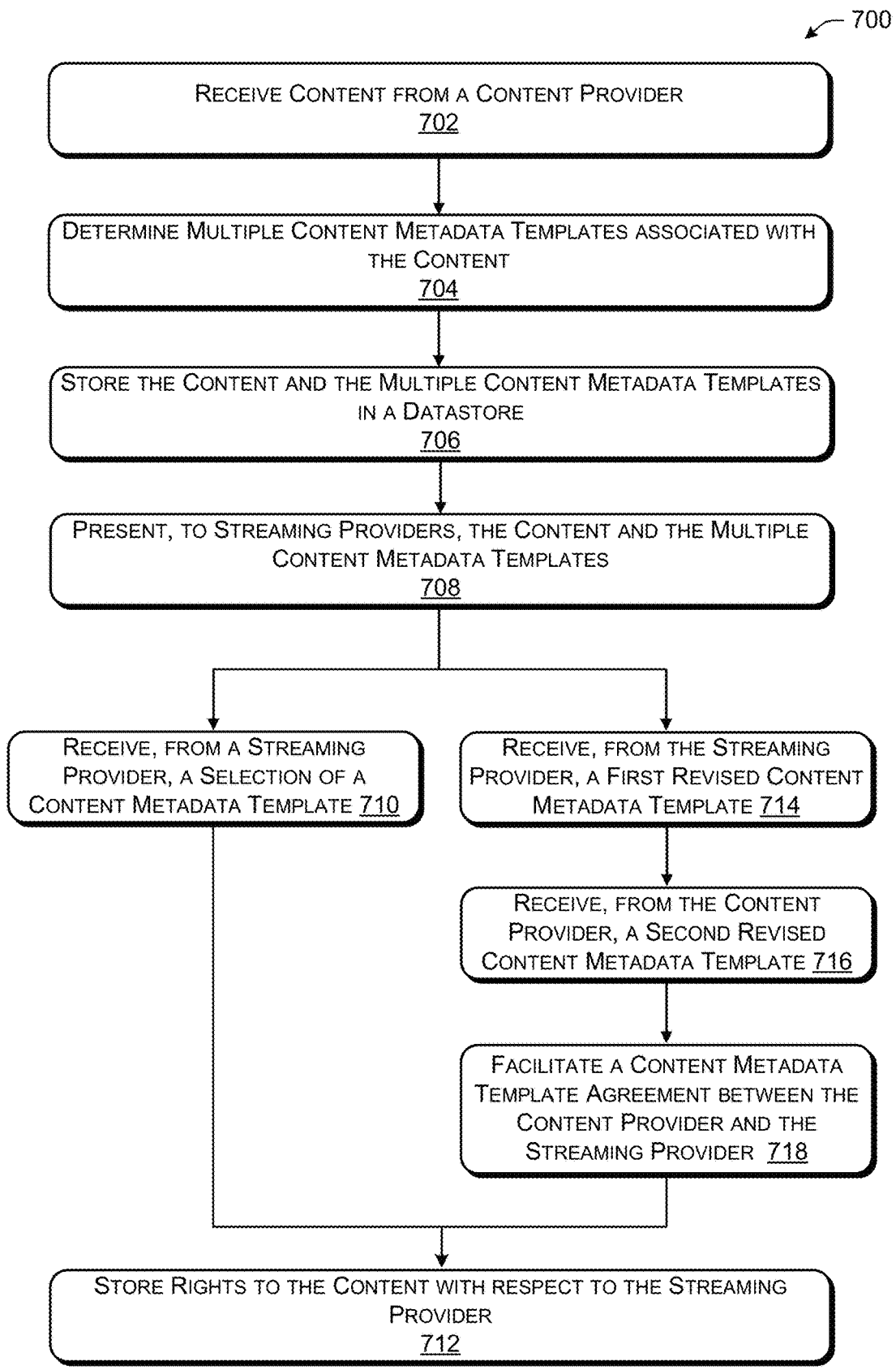
FIG. 7 is a schematic diagram of an illustrative process for facilitating the acquisition of rights to digital content between a content provider and a streaming provider.
Figure 8A:
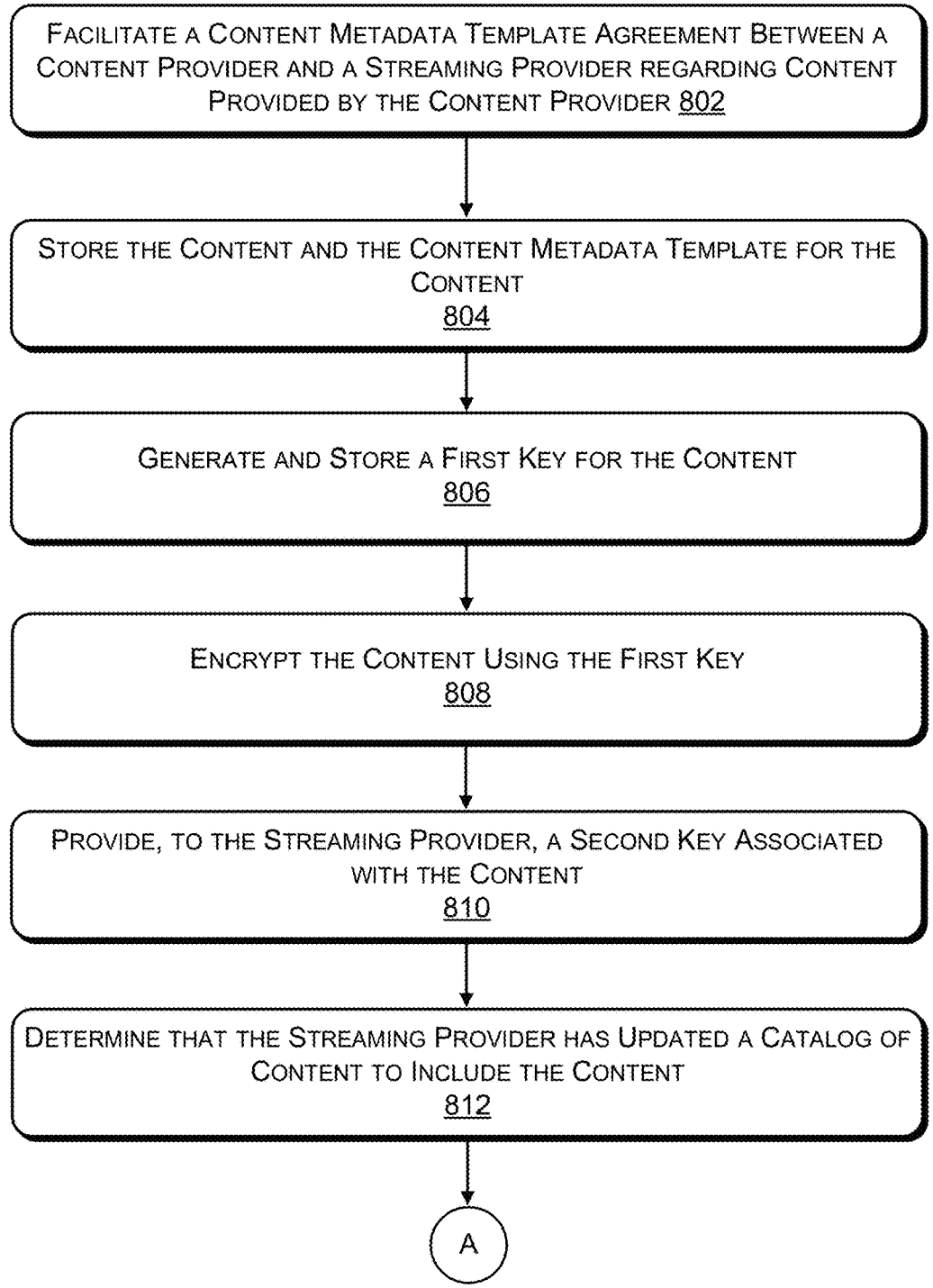
FIG. 8A is a schematic diagram of an illustrative process for facilitating the storage of content provided by a content provider and the encryption/decryption of the content with respect to a streaming provider that is to offer the content to customers.
Figure 8B:
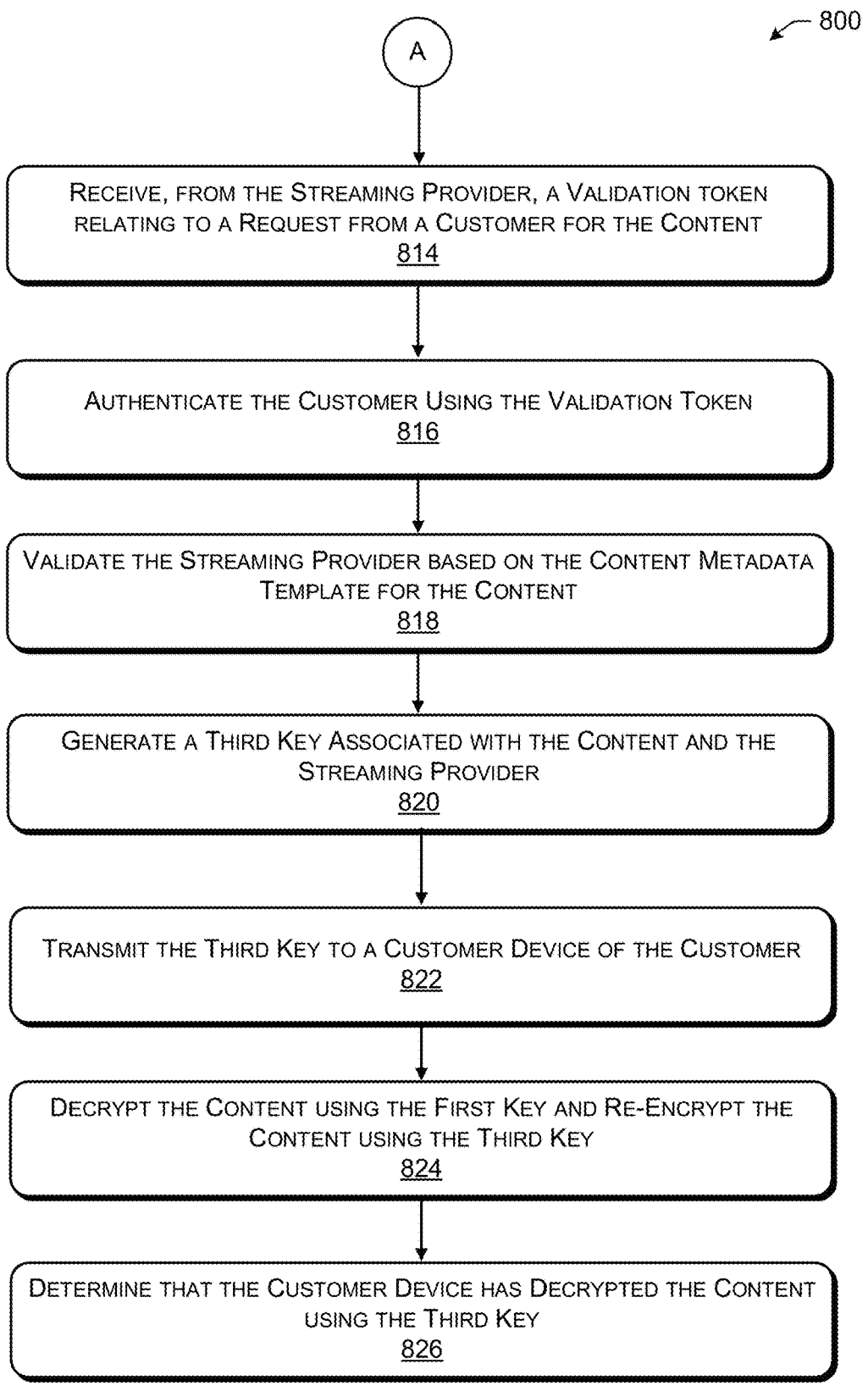
FIG. 8B is a schematic diagram of an illustrative process for facilitating the customer authentication of a customer that requested content from a streaming provider and the validation of the streaming provider by enforcing a content metadata template associated with the content.

FIGS. 7, 8A, and 8B are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure shall be interpreted accordingly.

FIG. 7 is a flow diagram of an illustrative process 700 to facilitate a streaming provider obtaining rights to a digital content item 114 of a content provider 104. The process 700 is described with reference to the environments and diagrams 100, 200, and 300 illustrated in FIGS. 1, 2, and 3, respectively. In particular, the process 700 may occur via a centralized site, portal, or service maintained by the CMS 102. Of course, the process 700 may be performed in other similar and/or different environments.

At 702, the CMS 102 receives content from a content provider. In particular, a content provider 104 may desire to make its digital content 114 available to streaming providers 106 and, therefore, provide the digital content 114 to the CMS 102. The digital content 114 may include movies, television programs/episodes/series, digital music, audio books, and so on.

At 704, the CMS 102 may determine multiple content metadata templates associated with the content. In some embodiments, the content provider 104 may provide one or more CMTs 122 that specify terms of use for acquiring rights to the digital content 114. In other embodiments, the CMS 102 may generate the CMTs 122 on behalf of the content provider 104.

At 706, the CMS 102 may store the content and the multiple content metadata templates in a datastore. The CMS 102 may store a copy of the digital content 114 in the content storage 118 and the corresponding CMTs 122 in the CMT datastore 124.

At 708, the CMS 102 may present, to streaming providers, the content and the multiple content metadata templates. In particular, the CMS 102 may provide a centralized site or platform where streaming providers 106 may search for and browse digital content 114 that is available to be acquired for streaming purposes. Along with each digital content item 114, the CMS 102 may present CMTs 122 associated with the digital content items 114, where the CMTs 122 specify terms of use of the digital content items 114.

At 710, the CMS 102 may receive, from a streaming provider, a selection of a content metadata template. The selection of the CMT 122 indicates an intent of the streaming provider 106 to acquire rights to the digital content item 114 such that the streaming provider 106 can stream/serve the digital content item 114 to its customers 108 via corresponding customer devices 110. If a single CMT 122 is provided with the digital content item 114, the streaming provider 106 may select that CMT 122. However, multiple CMTs 122 may be presented, with each having varying terms (e.g., price, duration, exclusivity, geography, etc.). Accordingly, the streaming provider 106 may select one of the multiple CMTs 122 that it seems most suitable/appropriate.

At 712, the CMS may store rights to the content with respect to the streaming provider. Provided that the streaming provider 106 selected one of the CMTs 122 via the CMS 102, the CMS 102 may cause the streaming provider 106 to have rights for the digital content item 114, meaning that the streaming provider 106 is now authorized to stream/serve the digital content item 114 to its customers 108. The CMS 102 will store the selected CMT 122 in the CMT datastore 124 for later retrieval.

At 714, the CMS may receive, from the streaming provider, a first revised content metadata template. In some scenarios, the streaming provider 106 may not find a CMT 122 for a digital content item 114 that suits its preferences/interests. Accordingly, the streaming provider 106 may, via the CMS 102, propose alternative terms for acquiring the rights to the digital content item 114. The streaming provider 106 may modify one or more of the terms of the CMT 122, propose a modified CMT 122, or propose a new, custom CMT 122.

At 716, the CMS may receive, from the content provider, a second revised content metadata template. Via the CMS 102, the content provider 104 may accept the revised CMT 122 and enter into an agreement to grant rights for the digital content item 114 to the streaming provider 106 pursuant to the terms of the revised CMT 122, which are likely different than the original CMT 122. Alternatively, the content provider 104 may propose different terms than those proposed by the streaming provider 106.

At 718, the CMS may facilitate a content metadata template agreement between the content provider and the streaming provider. For instance, via the CMS 102, the content provider 104 and the streaming provider 106 may negotiate the terms of the CMT 122 until an agreement is reached. When either party proposes terms for the CMT 122, the other party may receive an automated notification from the CMS 102.

Then, at 712, the CMS may store rights to the content with respect to the streaming provider. That is, the CMS 102 may update its databases, datastores, etc. to store the agreed upon CMT 122 and to reflect the CMT agreement reached between the content provider 104 and the streaming provider 106.

FIG. 8A is a flow diagram of an illustrative process 800 to facilitate a streaming provider obtaining rights to a digital content item 114 of a content provider 104. The process 800 is described with reference to the environments and diagrams 100, 400, and 500 illustrated in FIGS. 1, 4, and 5, respectively. In particular, the process 800 may occur via a centralized site, portal, or service maintained by the CMS 102, the CMS 102, and/or one or more CDSs 112. Of course, the process 800 may be performed in other similar and/or different environments.

At 802, the CMS may facilitate a content metadata template agreement between a content provider and a streaming provide regarding content provided by the content provider. The process of the streaming provider 106 obtaining rights to a digital content item 114 is described with respect to FIG. 7.

At 804, the CMS may store the content and the content metadata template for the content. As described herein, the digital content item 114 and the selected or agreed upon CMT 122 are stored in the content storage 118 and the CMT datastore 124, respectively, which are maintained by the CMS 102.

At 806, the CMS may generate and stores a first key for the content. The first key may correspond to the master key and may be used to secure the digital content item 114 while the digital content item 114 is being stored by the CMS 122. Moreover, the first key may be associated with the content provider 104.

At 808, the CMS may encrypt the content using the first key. The master key may be used to encrypt the digital content item 114 in order to prevent unauthorized access.

At 810, the CMS may provide, to the streaming provider, a second key associated with the content. The second key may be different than the first key and may be used to encrypt and/or decrypt the digital content item 114.

At 812, the CMS may determine that the streaming provider has updated a catalog of content to include the content. Upon obtaining rights to the digital content item 114 and receiving the second key associated with the digital content item 114, the streaming provider 106 may update its systems, websites, mobile applications, etc. to reflect that the digital content item 114 is now available for streaming to its customers 108.

FIG. 8B is a flow diagram of the illustrative process 800. The process 800 is described with reference to the environments and diagrams 100, 400, and 500 illustrated in FIGS. 1, 4, and 5, respectively. As stated above, the process 800 may occur via a centralized site, portal, or service maintained by the CMS 102, the CMS 102, and/or one or more CDSs 112. Of course, the process 800 may be performed in other similar and/or different environments. FIG. 8B is an extension of FIG. 8A, which illustrated steps 802-812.

At 814, the CMS may receive from the streaming provider, a validation token relating to a request from a customer for the content. Via the site/mobile application of the streaming provider 106, a customer 108 may request to play the digital content item 114. As a result, the streaming provider 106 may transmit that request to the CMS 102, along with other information/data relating to the request, such as the validation token.

At 816, the CMS and/or the CDNs may authenticate the customer using the validation token. Authentication of the customer 108 may verify that the customer 108 is authorized to stream content from the streaming provider 106.

At 818, the CMS and/or the CDNs may validate the streaming provider based on the content metadata template for the content. In particular, provided that the customer 108 is authenticated, the CMS 102 and/or the CDSs 112 may fetch the CMT 122 agreed upon by the streaming provider 106 to acquire rights to the digital content item 114 and enforce the CMT 122. That is, it may determine whether the CMT 122 has expired or is still valid.

At 820, the CMS and/or the CDNs may generate a third key associated with the content and the streaming provider. Provided that the streaming provider 106 is validated, a temporary key may be generated, where the temporary key may be used to re-encrypt and decrypt the digital content item 114 prior to consumption by the customer 108.

At 822, the CMS and/or the CDNs may transmit the third key to a customer device of the customer. The customer device 110 may store the third key in order to decrypt the digital content 114 when streamed by the CMS 102 and/or the CDSs 112.

At 824, the CMS and/or the CDNs may decrypt the content using the first key and re-encrypt the content using the third key. That is, the digital content item 114 to be streamed to the customer 108 may be decrypted using the master key and then re-encrypted using the third, temporary key. The digital content item 114 may then be streamed or served to the customer device 110 of the customer 108.

At 826, the CMS and/or the CDNs may determine that the customer device has decrypted the content using the third key. Using the third, temporary key stored by the customer device 110, the customer device 110 may decrypt the encrypted digital content item 114 such that the customer device 110 may play the digital content item 114.

Figure 9:
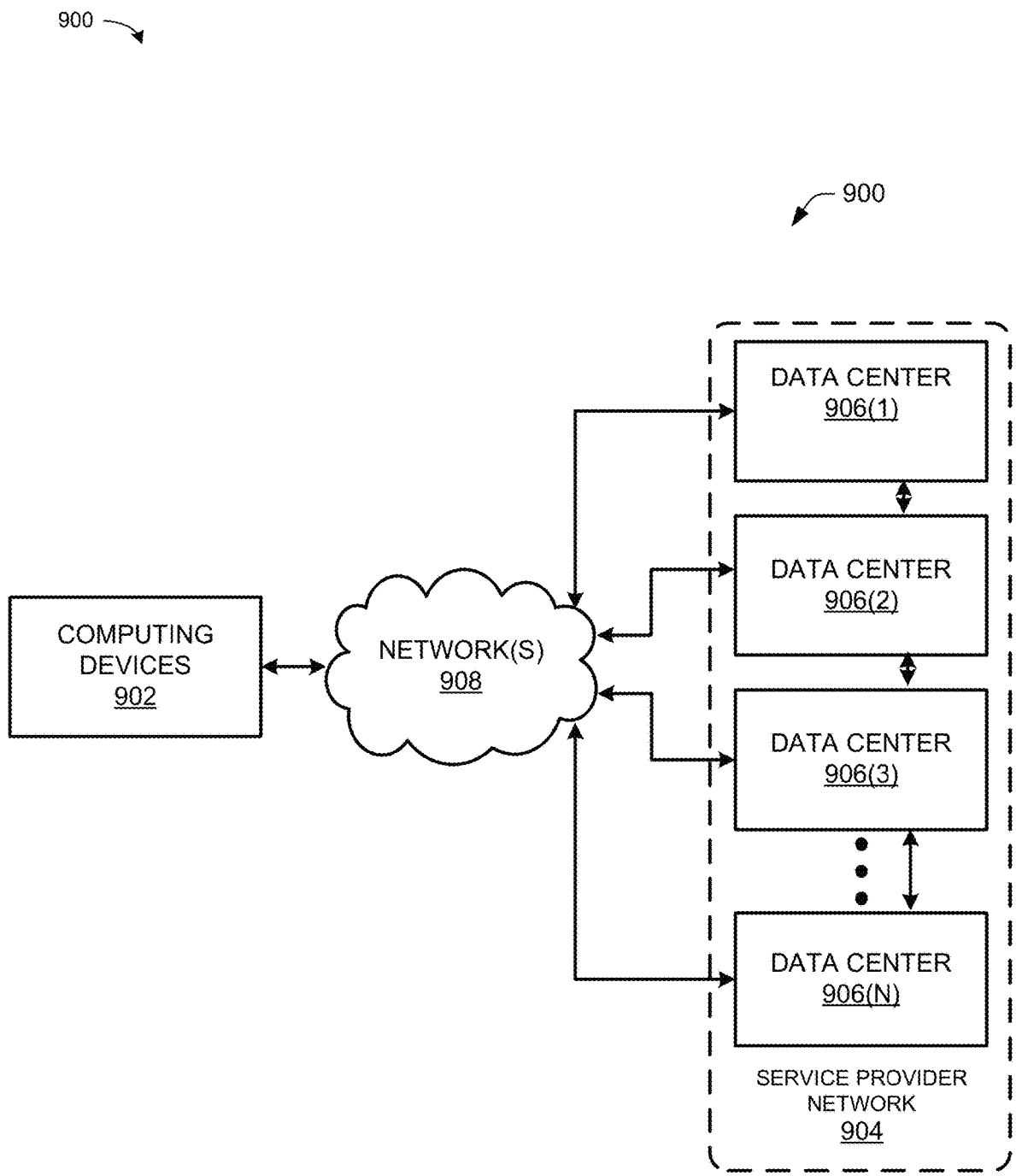
FIG. 9 is a block diagram that shows one illustrative operating environment for the examples disclosed herein that includes a service provider network.

FIG. 9 is a block diagram that shows an illustrative operating environment 900 for the examples disclosed herein that includes a service provider network. FIG. 9 and the following description are intended to provide a brief, general description of a suitable computing environment in which the examples described herein may be implemented. In particular, FIG. 9 is a system and network diagram that shows an illustrative operating environment that includes one or more computing devices 902 and a service provider network 904. As discussed above, service provider network 904 can provide virtual machine instances and computing resources on a permanent or an as-needed basis.

The computing resources provided by the service provider network 904 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 904 are enabled in one implementation by one or more data centers 906(1)-906(N) (which may be referred to herein singularly as "a data center 906" or collectively as "the data centers 906"). The data centers 906 are facilities utilized to house and operate computer systems and associated components. The data centers 906 typically include redundant and backup power, communications, cooling and security systems. The data centers 906 might also be located in geographically disparate locations. One illustrative configuration for a data center 906 that implements some or all of the concepts and technologies disclosed herein will be described below with regard to FIG. 10.

The users and customers of service provider network 904 may access the computing resources provided by the data centers 906 over a suitable data communications network, such as a Wide Area Network ("WAN"), as illustrated by network(s) 908. Although a WAN might be used, it should be appreciated that a local-area network ("LAN"), the Internet, or any other networking topology known in the art that connects the data centers 906 to the computing devices 902 (such as the user devices 106 illustrated in FIG. 1) may be utilized. It should also be appreciated that combinations of such networks might also be utilized.

Figure 10:
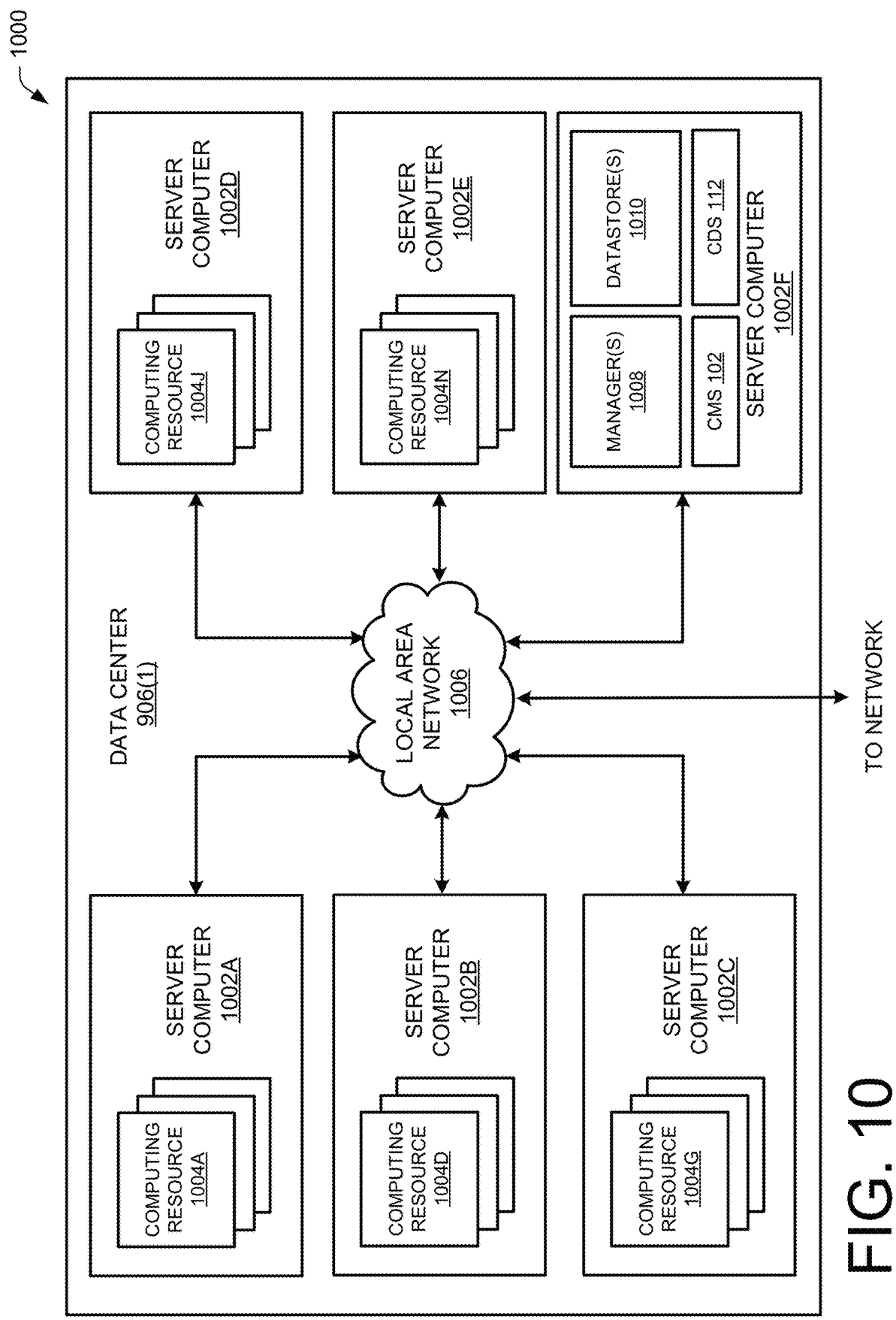
FIG. 10 is a block diagram that illustrates one configuration for a data center that implements aspects of a service provider network, including some or all of the concepts and technologies disclosed herein.

FIG. 10 is a block diagram that illustrates an illustrative architecture 1000 of one configuration for a data center 906 that implements aspects of the service provider network 904, including some or all of the concepts and technologies disclosed herein. The example data center 906(1) shown in FIG. 10 includes several server computers 1002A-1002F (which may be referred to herein singularly as "a server computer 1002" or in the plural as "the server computers 1002") for providing computing resources. The server computers 1002 may be standard tower or rack-mount server computers configured appropriately for providing the computing resources described herein. According to an example, the server computers 1002 are configured to execute the software products as described above.

In an example, some of the computing resources 1004 are virtual machine instances. As known in the art, a virtual machine instance is an instance of a software implementation of a machine (i.e. a computer) that executes programs like a physical machine. Each of the server computers 1002 may be configured to execute an instance manager capable of instantiating and managing computing resources and instances of computing resources. In the case of virtual machine instances, for example, the instance manager might be a hypervisor or another type of program configured to enable the execution of multiple virtual machine instances on a single server computer 1002, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 906(1) shown in FIG. 10 also includes a server computer 1002F reserved for executing software components for managing the operation of the data center 906(1), the server computers 1002, virtual machine instances, and other resources within the service provider network 904. The server computer 1002F might also execute one or more managers 1008 and include one or more datastores 1010, the CMS 102, and the CDS 112. In this regard, it should be appreciated that while these components are illustrated as executing within service provider network 904, computing systems that are external to service provider network 904 might also be utilized to execute some or all of these components. Other configurations might also be utilized.

In the example data center 906(1) shown in FIG. 10, an appropriate local area network ("LAN") 1006 is utilized to interconnect the server computers 1002A-1002E and the server computer 1002F. The LAN 1006 is also connected to the network(s) 908 illustrated in FIG. 9. It should be appreciated that the configuration and network topology illustrated in FIGS. 9 and 10 has been greatly simplified and that many more computing systems, networks and networking devices may be utilized to interconnect the various computing systems disclosed herein. Appropriate load balancing devices or software modules might also be utilized for balancing a load between each of the data centers 906(1)-906(N), between each of the server computers 1002A-1002F in each data center 906 and between virtual machine instances and other types of computing resources provided by the service provider network 904.

It should be appreciated that the data center 906(1) described in FIG. 10 is merely illustrative and that other implementations might also be utilized. Additionally, it should be appreciated that the functionality provided by these components might be implemented in software, hardware, or a combination of software and hardware. Other implementations should be apparent to those skilled in the art.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
one or more processors; and
memory storing computer-implemented instructions that, when executed, cause the one or more processors to:
receive, from a content provider and at one or more servers associated with a content management service, a digital content item and multiple content metadata templates that each specify different terms of use for the digital content item;
encrypt, by the content management service, the digital content item using a first encryption key, store the digital content item in first storage, and store the first encryption key in second storage;
present, via a site that is accessible by the content provider and streaming providers, the digital content item and the multiple content metadata templates;
determine a selection, via the site and by the content provider or a streaming provider of the streaming providers, of a content metadata template of the multiple content metadata templates or modified content metadata template, the selection indicating that the streaming provider has obtained rights to the digital content item pursuant to the content metadata template or the modified content metadata template;
store the content metadata template or the modified content metadata template in third storage;
send, by a content delivery service that is different than the content management service and to the streaming provider, a second encryption key associated with the digital content item, the second encryption key being stored in the second storage;
receive, by the content management service and from the streaming provider, a request to stream the digital content item to a customer of the streaming provider, the request including a validation token associated with the customer;
authenticate, by the content delivery service and using the validation token, the customer to confirm that the customer is authorized to stream content offered by the streaming provider;
validate, by the content delivery service, based on authenticating the customer, and based on the content metadata template or the modified content metadata template, the streaming provider to confirm that the streaming provider is authorized to stream the digital content item to customers;
send, by the content delivery service and based on validating the streaming provider, a third encryption key to a customer device of the customer, the third encryption key being stored in the second storage;
decrypt, by the content delivery service, the digital content item using the first encryption key;
re-encrypt, by the content delivery service, the digital content item using the third encryption key; and
cause, by the content delivery service the digital content item to be streamed to the customer device of the customer, the customer device decrypting the digital content item using the third encryption key prior to rendering the digital content item.

2. The system as recited in claim 1, wherein validating the streaming provider comprises:
retrieving, by the content delivery service and based on validating the customer, the content metadata template or the modified content metadata template from the third storage; and
determining that a time associated with the request is prior to an expiration time specified in the content metadata template or the modified content metadata template.

3. The system as recited in claim 1, wherein the digital content item is streamed to the customer device of the customer without providing a copy of the digital content item to the streaming provider.

4. The system as recited in claim 1, wherein determining the selection of the modified content metadata template comprises:
receiving, via the site and from the streaming provider, one or more terms that are different than terms specified in the multiple content metadata templates;
sending, based on receiving the one or more terms, a first notification to the content provider;
receiving, via the site and from the content provider, acceptance of the one or more terms;
sending, based on receiving the acceptance of the one or more terms, a second notification to the streaming provider; and
storing, based on the acceptance of the one or more terms, the modified content metadata template in the third storage, the modified content metadata template including the one or more terms.

5. The system as recited in claim 1, wherein authenticating the customer comprises validating the validation token to confirm that the customer maintains an account with the streaming provider or to confirm that the validation token has not expired.

6. A method comprising:
   determining that a content facilitator has obtained rights to a digital content item associated with a content provider pursuant to a content metadata template;
   receiving, by a content delivery service and from a content management service that stores the digital content item, the digital content item in an encrypted format, the digital content being requested by a customer device via the content facilitator;
   determining, by the content delivery service and based at least partly on the request, that the customer device is associated with a customer of the content facilitator;
   determining, by the content delivery service and based at least partly on the request and the content metadata template, that the content facilitator is authorized to provide the digital content item to customers; and
   causing, by the content delivery service, the digital content item to be provided to the customer device without providing a copy of the digital content item to the content facilitator.

7. The method as recited in claim 6, further comprising:
   receiving, from the content provider and via a site accessible to content providers of digital content items and content facilitators that provide digital content to customers, the digital content item and one or more content metadata templates associated with the digital content item;
   encrypting the digital content item using an encryption key associated with the content provider;
   storing the digital content item, the content metadata template, and the encryption key; and
   prior to causing the digital content item to be provided to the customer device, decrypting the digital content item using the encryption key.

8. The method as recited in claim 6, wherein the request includes a validation token associated with the customer, and further comprising determining that the customer device is associated with the customer of the content facilitator based at least partly on the validation token.

9. The method as recited in claim 6, wherein determining that the content facilitator is authorized to provide the digital content item to customers comprises determining that a time associated with the request is prior to an expiration time specified in the content metadata template.

10. The method as recited in claim 6, further comprising:
    encrypting the digital content item using a first encryption key associated with the content provider;
    based at least partly on determining that the customer device is associated with the customer of the content facilitator and determining that the content facilitator is authorized to provide the digital content item to customers, decrypting the digital content item using the first encryption key;
    re-encrypting the digital content item using a second encryption key that is different than the first encryption key; and
    prior to causing the digital content item to be provided to the customer device, sending the second encryption key to the customer device.

11. The method as recited in claim 10, wherein the second encryption key is used by the customer device to decrypt the digital content item prior to consumption of the digital content item via the customer device.

12. The method as recited in claim 6, wherein determining that the content facilitator has obtained rights to the digital content item comprises:
    presenting, via a site that is accessible by content providers and content facilitators, the digital content item and the one or more content metadata templates;
    receiving, via the site and by the content facilitator, a selection of the content metadata template from the one or more content metadata template, the selection indicating that the content facilitator has obtained the rights to the digital content item pursuant to terms specified in the content metadata template.

13. The method as recited in claim 6, wherein determining that the content facilitator has obtained rights to the digital content item comprises:
    presenting, via a site that is accessible by content providers and content facilitators, the digital content item and the one or more content metadata templates;
    receiving, via the site and from the content facilitator, one or more terms that are different than terms specified in the one or more content metadata templates;
    receiving, via the site and from the content provider, acceptance of the one or more terms; and
    storing, based at least partly on the acceptance of the one or more terms, a modified content metadata template, the modified content metadata template specifying the one or more terms.

14. The method as recited in claim 6, wherein the digital content item is provided to the customer device using one or more content delivery networks that maintain a copy of the content metadata template.

15. A method comprising:
    determining that a content facilitator has obtained rights to a digital content item associated with a content provider pursuant to a content metadata template;
    receiving the digital content item in an encrypted format, the digital content item being associated with a request via the content facilitator;
    determining that the request is associated with a customer of the content facilitator;
    determining, based at least partly on the content metadata template, that the content facilitator is authorized to provide the digital content item to the customer;
    decrypting the digital content item using the first encryption key;
    re-encrypting the digital content using a second encryption key that is different than the first encryption key;
    sending the second encryption key to a customer device associated with the customer; and
    causing the digital content item to be provided to the customer device.

16. The method as recited in claim 15, wherein the request includes a validation token associated with the customer, and further comprising determining that the request is associated with the customer of the content facilitator based at least partly on the validation token.

17. The method as recited in claim 15, wherein determining that the content facilitator is authorized to provide the digital content item to the customer comprises determining that a time associated with the request is prior to an expiration time specified in the content metadata template.

18. The method as recited in claim 15, wherein the second encryption key is associated with a first portion of the digital content item that is less than an entirety of the digital content item, and wherein a second portion of the digital content item is associated with a third encryption key that is different than the second encryption key.

19. The method as recited in claim 15, further comprising causing the digital content item to be provided to the customer device without providing a copy of the digital content item to the content facilitator.

20. The method as recited in claim 15, further comprising:
- storing the digital content item in first storage in association with other digital content items associated with the content provider;
- storing the first encryption key and the second encryption key in second storage; and
- storing the content metadata template in third storage.

* * * * *